US011169864B2

(12) United States Patent
Ranjan et al.

(10) Patent No.: US 11,169,864 B2
(45) Date of Patent: Nov. 9, 2021

(54) SYSTEMS, METHODS AND COMPUTER PROGRAM PRODUCTS FOR APPLICATION ENVIRONMENT SYNCHRONIZATION BETWEEN REMOTE DEVICES AND ON-PREMISE DEVICES

(71) Applicant: Spillbox Inc., San Jose, CA (US)

(72) Inventors: Ashish Ranjan, San Ramon, CA (US); Alok Kumar Sinha, San Jose, CA (US)

(73) Assignee: SPILLBOX INC., San Jose, CA (US)

( * ) Notice: Subject to any disclaimer, the term of this patent is extended or adjusted under 35 U.S.C. 154(b) by 0 days.

(21) Appl. No.: 16/690,661

(22) Filed: Nov. 21, 2019

(65) Prior Publication Data

US 2021/0157663 A1    May 27, 2021

(51) Int. Cl.
| | |
|---|---|
| *G06F 9/54* | (2006.01) |
| *G06F 16/182* | (2019.01) |
| *H04L 29/08* | (2006.01) |
| *H04L 12/24* | (2006.01) |

(52) U.S. Cl.
CPC ............ *G06F 9/548* (2013.01); *G06F 16/183* (2019.01); *H04L 41/0806* (2013.01); *H04L 67/10* (2013.01); *H04L 67/34* (2013.01)

(58) Field of Classification Search
CPC ... G06F 9/548; G06F 16/183; H04L 41/0806; H04L 67/10; H04L 67/34
See application file for complete search history.

(56) References Cited

U.S. PATENT DOCUMENTS

| | | | | |
|---|---|---|---|---|
| 7,743,019 | B2 * | 6/2010 | Shah | G06F 16/288 707/610 |
| 8,112,505 | B1 * | 2/2012 | Ben-Shaul | G06F 16/1767 709/219 |
| 9,251,114 | B1 * | 2/2016 | Ancin | G06F 16/178 |
| 9,398,087 | B1 * | 7/2016 | Hosie | G06F 8/60 |
| 9,781,191 | B2 * | 10/2017 | Kashyap | G06F 9/5083 |
| 10,146,788 | B1 * | 12/2018 | Weatherall | G06F 3/067 |
| 10,148,493 | B1 * | 12/2018 | Ennis, Jr. | G06F 9/541 |
| 10,893,106 | B1 * | 1/2021 | Saladi | H04L 67/1097 |
| 2007/0244987 | A1 | 10/2007 | Pedersen | |

(Continued)

OTHER PUBLICATIONS

ISR Search Report for PCT/IB2020/060778.
Written Opinion for PCT/IB2020/060778.

*Primary Examiner* — Blake J Rubin
(74) *Attorney, Agent, or Firm* — Schroeder Law PC

(57) ABSTRACT

The invention provides systems, methods and computer program products for executing remote application iteration(s) of client application software on a remote server platform, and for enabling each remote application iteration of a client application software to have access to a corresponding instance of an application software environment that contains or otherwise has access to data object(s) necessary for execution of the remote application iteration. The invention additionally enables execution of a remote application iteration of a client software application at a remote server platform, through need-based or dynamic retrieval of data objects from an on-premise device for provisioning (on the remote platform server) an instance of the client software application environment required for execution of the remote application iteration of the client software application.

17 Claims, 14 Drawing Sheets

(56) References Cited

U.S. PATENT DOCUMENTS

| | | | |
|---|---|---|---|
| 2012/0072898 A1* | 3/2012 | Pappas | G06F 21/10 717/171 |
| 2012/0084333 A1* | 4/2012 | Huang | G06F 16/27 707/827 |
| 2014/0007079 A1* | 1/2014 | Whitney | H04L 67/10 717/176 |
| 2014/0172783 A1* | 6/2014 | Suzuki | G06F 8/63 707/609 |
| 2014/0258872 A1* | 9/2014 | Spracklen | H04L 41/5009 715/736 |
| 2015/0088942 A1* | 3/2015 | Shah | H04L 41/50 707/827 |
| 2015/0193514 A1* | 7/2015 | Bradshaw | G06F 16/178 707/638 |
| 2015/0278323 A1* | 10/2015 | Melahn | G06F 16/178 707/610 |
| 2015/0286389 A1* | 10/2015 | Conover | G06F 9/45558 715/738 |
| 2015/0356113 A1* | 12/2015 | Suryanarayanan | G06F 16/178 707/617 |
| 2016/0048408 A1* | 2/2016 | Madhu | G06F 11/2023 718/1 |
| 2016/0119413 A1* | 4/2016 | Antipa | H04L 67/104 709/204 |
| 2016/0124665 A1* | 5/2016 | Jain | H04L 67/1007 711/162 |
| 2016/0277497 A1* | 9/2016 | Bannister | G06F 3/0605 |
| 2016/0321287 A1* | 11/2016 | Luthra | G06F 9/46 |
| 2016/0350326 A1* | 12/2016 | Simonetti | G06F 16/137 |
| 2016/0364201 A1* | 12/2016 | Beveridge | H04L 67/08 |
| 2017/0017551 A1* | 1/2017 | Nichols | G06F 11/1451 |
| 2017/0060702 A1* | 3/2017 | Dave | G06F 11/1441 |
| 2017/0115980 A1* | 4/2017 | Bagal | G06F 8/65 |
| 2017/0168903 A1* | 6/2017 | Dornemann | G06F 11/2097 |
| 2017/0264684 A1* | 9/2017 | Spillane | H04L 67/1095 |
| 2017/0364699 A1* | 12/2017 | Goldfarb | G06F 21/6227 |
| 2018/0137174 A1* | 5/2018 | Cahana | G06F 9/455 |
| 2018/0300367 A1* | 10/2018 | Yu | G06F 16/2365 |
| 2019/0205411 A1* | 7/2019 | Lai | G06F 16/168 |
| 2019/0213265 A1* | 7/2019 | Boerner | G06F 16/122 |
| 2019/0266258 A1* | 8/2019 | Chen | G06F 16/178 |
| 2020/0007530 A1* | 1/2020 | Mohamad Abdul | H04L 67/26 |
| 2020/0201918 A1* | 6/2020 | Karande | H04L 65/4084 |
| 2020/0311028 A1* | 10/2020 | Korepanov | G06F 16/178 |
| 2021/0132811 A1* | 5/2021 | Puvvada | G06F 3/065 |

* cited by examiner

| User ID | Application ID | Remote Application Iteration ID | Environment Instance ID | On-Premise Application Information |
|---|---|---|---|---|
| | | | | |
| | | | | |
| | | | | |
| | | | | |

Figure 3B

SYSTEMS, METHODS AND COMPUTER PROGRAM PRODUCTS FOR APPLICATION ENVIRONMENT SYNCHRONIZATION BETWEEN REMOTE DEVICES AND ON-PREMISE DEVICES

FIELD OF THE INVENTION

The present invention relates to the domain of cloud based or remote device based computing, and more particularly to methods, systems and computer program products for enabling remote device based execution of a client software application through need-based or dynamic retrieval of data objects by the remote device from an on-premise device.

BACKGROUND OF THE INVENTION

Cloud based or network based data centers for providing on-demand computing infrastructure has become widespread. Client application software that were previously executed only on computing devices within the premises of an entity or organization ("On-premise device(s)"), is now capable of being executed on remote servers or remote computing devices located at a remote facility outside the client premises (for example, within a server farm or cloud).

FIG. 1 illustrates an exemplary system environment 100 that is configured to provide a cloud based infrastructure for remote execution of client application software. System environment 100 comprises on-premise device 102, network 104 and remote server platform 106.

On-premise device 102 may comprise any server 102a and/or other computing device 102b having a client application software installed thereon, and having a corresponding application environment implemented thereon. The application environment corresponding to the client application software comprises a plurality of data objects (e.g. software data files) stored within a file system associated with on-premise device 102—the one or more data objects comprising (i) application software data objects—comprising data objects that include application software code, application software libraries and/or application software data files, and/or (ii) user generated data objects—comprising user specific data or user generated data associated with operations of the application software code.

Network 104 may comprise any data network that enables data communication between entities connected to the network—and may in various non-limiting embodiments include any of a local area network, wide area network, distributed data network, or internetwork such as the Internet.

Remote server platform 106 comprises a remote server 106a and a memory or database 106b communicatively coupled thereto. Remote server 106a is configured to instantiate and run within remote server platform 106, a remote iteration (i.e. remote instance) of the client application software that is installed on on-premise device 102. For the purposes of instantiating and executing the remote iteration of the client application software, remote server platform 106 would have installed thereon, an iteration of executable application software code corresponding to the client application software. Additionally however, remote server 106a requires access to an application environment (within remote server platform 106), corresponding to the remote iteration of the client application software that is installed within remote server platform 106. The application environment within remote server platform 106 provides the remote iteration of the client application software with access to application software data objects and user generated data objects necessary for execution of the remote iteration of the client application software.

It would be understood that the application environment within remote server platform 106 requires to have stored therewithin, application software data objects and user generated data objects that are consistent with a corresponding application environment that is stored at on-premise device 102. Failure to ensure that the application environment within the remote server has access to all necessary data objects from an application environment within on-premise device 102 results in either (i) failure or error in execution of the remote iteration of the client application software, or (ii) data outputs from the remote iteration of the client application software that are inconsistent with data outputs that would have been generated by a corresponding execution of the client application software within on-premise device 102.

Existing solutions to enable cloud based execution of client application software resolve this problem by cloning or reproducing the entire application environment from on-premise device 102, at remote server platform 106, prior to executing the remote iteration of the client application software. This approach has been found to have several drawbacks.

The first serious drawback is that reproducing the entire application environment at remote server platform 106 is data and time intensive. Depending on network bandwidth and network latency, the process of provisioning the necessary application environment within remote server platform 106 can involve significant amounts of time, and a large network overhead—arising from the need to reproduce all data objects within the application environment, regardless of whether they are actually required for the remote application iteration that is being executed at remote server platform 106.

Additionally, a user may want to run multiple remote iterations of the client application software within remote server platform 106—in which case, each remote iteration of the client application software will require to generate and provision a corresponding instance of the application environment at remote server platform 106. This exponentially increases the overhead and latency concerns—and in certain cases may place undesirable or unserviceable loads upon on-premise device 102. At the same time, generating a single common instance of the application environment at remote server platform 106 for use by all remote application iterations of the client application software is not feasible, as each remote application iteration of the client application software requires to independently operate on and effect state changes within the corresponding application environment—and changes made by a first remote application iteration of the client application software may interfere with the desired operation of a second remote application iteration of the client application software.

There is accordingly a need for a secure, effective and computationally efficient solution for executing remote application iteration(s) of client application software on a remote server platform, and for enabling each remote application iteration of a client application software to have access to a corresponding instance of an application software environment that has access to all necessary data objects required for execution of that remote application iteration.

SUMMARY OF THE INVENTION

The invention provides systems, methods and computer program products for executing remote application iteration(s) of client application software on a remote server platform, and for enabling each remote application iteration of a client application software to have access to a corresponding instance of an application software environment that has access to all data objects necessary for execution of such remote application iteration. The invention additionally enables execution of a remote application iteration of a client software application at a remote server platform, through need-based or dynamic retrieval of data objects from an on-premise device for appropriately provisioning the remote platform server to execute the remote iteration of the client software application.

The invention provides a method for execution of an application software iteration at a remote server through network based access to an on-premise device. The method comprises (i) instantiating at the remote server (a) a remote application iteration of a client application software, wherein said client application software has a corresponding local instance of an application environment stored on the on-premise device, and (b) a remote application environment instance corresponding to the remote application iteration, (ii) executing at the remote server, application software code corresponding to the remote application iteration, (iii) identifying one or more data objects required by the application software code, (iv) responsive to determining that the identified one or more data objects are not available within the remote application environment instance, initiating retrieval of the identified one or more data objects from the local instance of an application environment stored on the on-premise device, and (v) executing the application software code at the remote server based on the one or more data objects retrieved from the local instance of an application environment stored on the on-premise device.

In an embodiment of the method, the remote server receives from the on-premise device, metadata describing one or more data states associated with the local instance of the application environment stored on the on-premise device.

In a specific method embodiment, the metadata received at the remote server is metadata that is selected for transmission from the on-premise device to the remote server based on the one or more data objects that have been retrieved from the local instance of an application environment stored on the on-premise device.

In one embodiment of the method, the metadata received at the remote server comprises data that describes attributes of one or more data files, data records, directories, folders or file paths within a file system corresponding to the on-premise device.

In another method embodiment, metadata received at the remote server is application environment data associated with each file system directory or file system folder of the on-premise device from which one or more data objects have been retrieved and transmitted to the remote server.

In a particular embodiment of the method, the remote server (i) generates or modifies a metadata image based on metadata received from the on-premise device, and (ii) stores the metadata image in a memory accessible by the remote server, and associating the stored metadata image with the remote application environment instance.

In an exemplary embodiment of the method, retrieving the identified one or more data objects from the local instance of an application environment stored on the on-premise device comprises (i) parsing the stored metadata image that is associated with the remote application environment instance for metadata corresponding to the identified one or more data objects, and (ii) responsive to retrieval of metadata corresponding to the identified one or more data objects from the metadata image, transmit to the on-premise device, a data object retrieval request message that includes all or some of the metadata retrieved from the metadata image.

In a method embodiment, the identified one or more data objects that are subsequently received from the on-premise device in response to the transmitted data object retrieval request message, are retrieved from the on-premise device based on the metadata included within the data object retrieval request message.

The invention additionally provides a system for execution of an application software iteration at a remote server through network based access to an on-premise device, the system comprising a remote server configured for (i) instantiating (a) a remote application iteration of a client application software, wherein said client application software has a corresponding local instance of an application environment stored on the on-premise device, and (b) a remote application environment instance corresponding to the remote application iteration, (ii) executing application software code corresponding to the remote application iteration, (iii) identifying one or more data objects required by the application software code, (iv) responsive to determining that the identified one or more data objects are not available within the remote application environment instance, initiating retrieval of the identified one or more data objects from the local instance of an application environment stored on the on-premise device, and (v) executing the application software code at the remote server based on the one or more data objects retrieved from the local instance of an application environment stored on the on-premise device.

In an embodiment of the system, the remote server is configured to receive from the on-premise device, metadata describing one or more data states associated with the local instance of the application environment stored on the on-premise device.

In another embodiment of the system, the metadata received at the remote server is metadata that is selected for transmission from the on-premise device to the remote server based on the one or more data objects that have been retrieved from the local instance of an application environment stored on the on-premise device.

The system may be configured such that the metadata received at the remote server comprises data that describes attributes of one or more data files, data records, directories, folders or file paths within a file system corresponding to the on-premise device.

The system may further be configured such that, the metadata received at the remote server is application environment data associated with each file system directory or file system folder of the on-premise device from which one or more data objects have been retrieved and transmitted to the remote server.

In a system embodiment, the remote server is configured to (i) generates or modifies a metadata image based on metadata received from the on-premise device, and (ii) store the metadata image in a memory accessible by the remote server, and associating the stored metadata image with the remote application environment instance.

In another system embodiment, the remote server is configured such that, retrieving the identified one or more data objects from the local instance of an application environment stored on the on-premise device comprises (i) parsing the stored metadata image that is associated with the remote application environment instance for metadata corresponding to the identified one or more data objects, and (ii)

responsive to retrieval of metadata corresponding to the identified one or more data objects from the metadata image, transmit to the on-premise device, a data object retrieval request message that includes all or some of the metadata retrieved from the metadata image.

In a particular embodiment of the system as claimed in claim 15, wherein the identified one or more data objects that are subsequently received from the on-premise device in response to the transmitted data object retrieval request message, are retrieved from the on-premise device based on the metadata included within the data object retrieval request message.

The invention additionally provides a computer program product for execution of an application software iteration at a remote server through network based access to an on-premise device. The computer program product comprises a non-transitory computer usable medium having a computer readable program code embodied therein, the computer readable program code comprising instructions for implementing within a processor based computing system, the steps of (i) instantiating at the remote server (a) a remote application iteration of a client application software, wherein said client application software has a corresponding local instance of an application environment stored on the on-premise device, and (b) a remote application environment instance corresponding to the remote application iteration, (ii) executing at the remote server, application software code corresponding to the remote application iteration, (iii) identifying one or more data objects required by the application software code, (iv) responsive to determining that the identified one or more data objects are not available within the remote application environment instance, initiating retrieval of the identified one or more data objects from the local instance of an application environment stored on the on-premise device and (v) executing the application software code at the remote server based on the one or more data objects retrieved from the local instance of an application environment stored on the on-premise device.

BRIEF DESCRIPTION OF THE DRAWINGS

FIG. 3B illustrates an exemplary data structure configured for enabling remote execution of client application software in accordance with the teachings of the present invention.

DETAILED DESCRIPTION OF THE INVENTION

The invention provides systems, methods and computer program products for executing remote application iteration(s) of client application software on a remote server platform, and for enabling each remote application iteration of a client application software to have access to a corresponding instance of an application software environment that contains or otherwise has access to data object(s) necessary for execution of the remote application iteration. The invention additionally enables execution of a remote application iteration of a client software application at a remote server platform, through need-based or dynamic retrieval of data objects from an on-premise device for provisioning (on the remote platform server) an instance of the client software application environment required for execution of the remote application iteration of the client software application.

Figure 1:
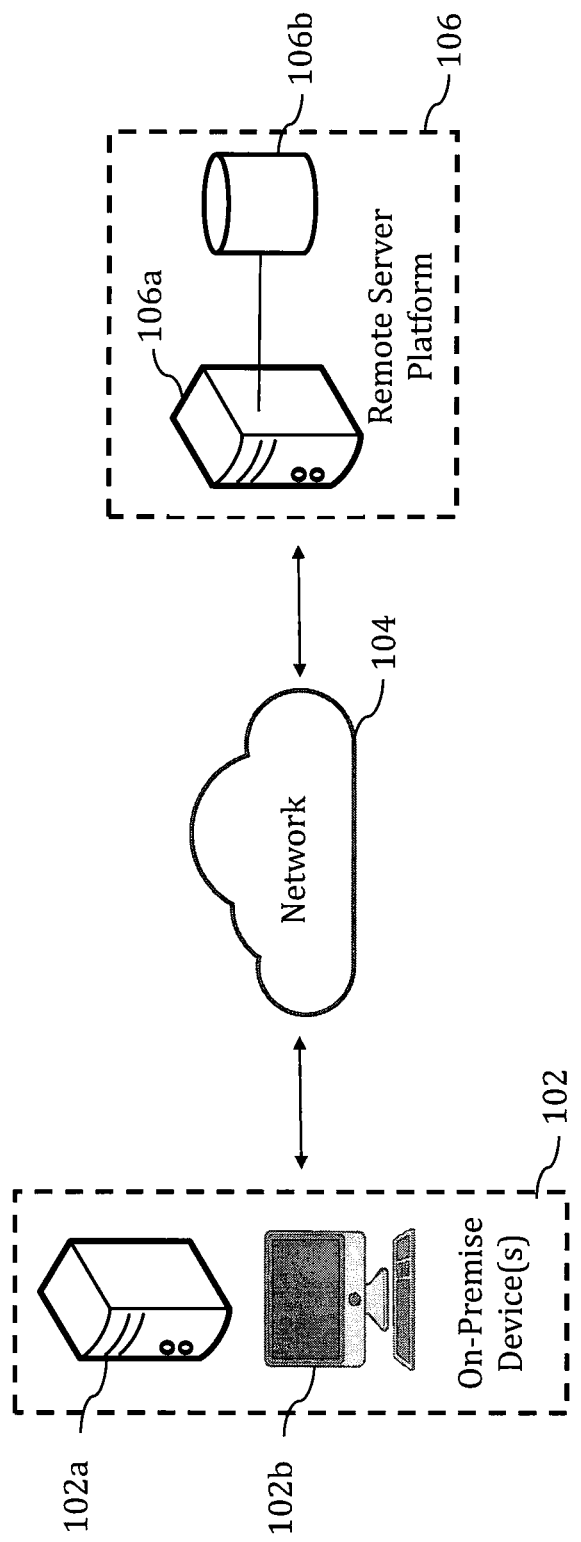
FIG. 1 illustrates a prior art system environment that is configured to provide a cloud based infrastructure for remote execution of client application software.
Figure 2:
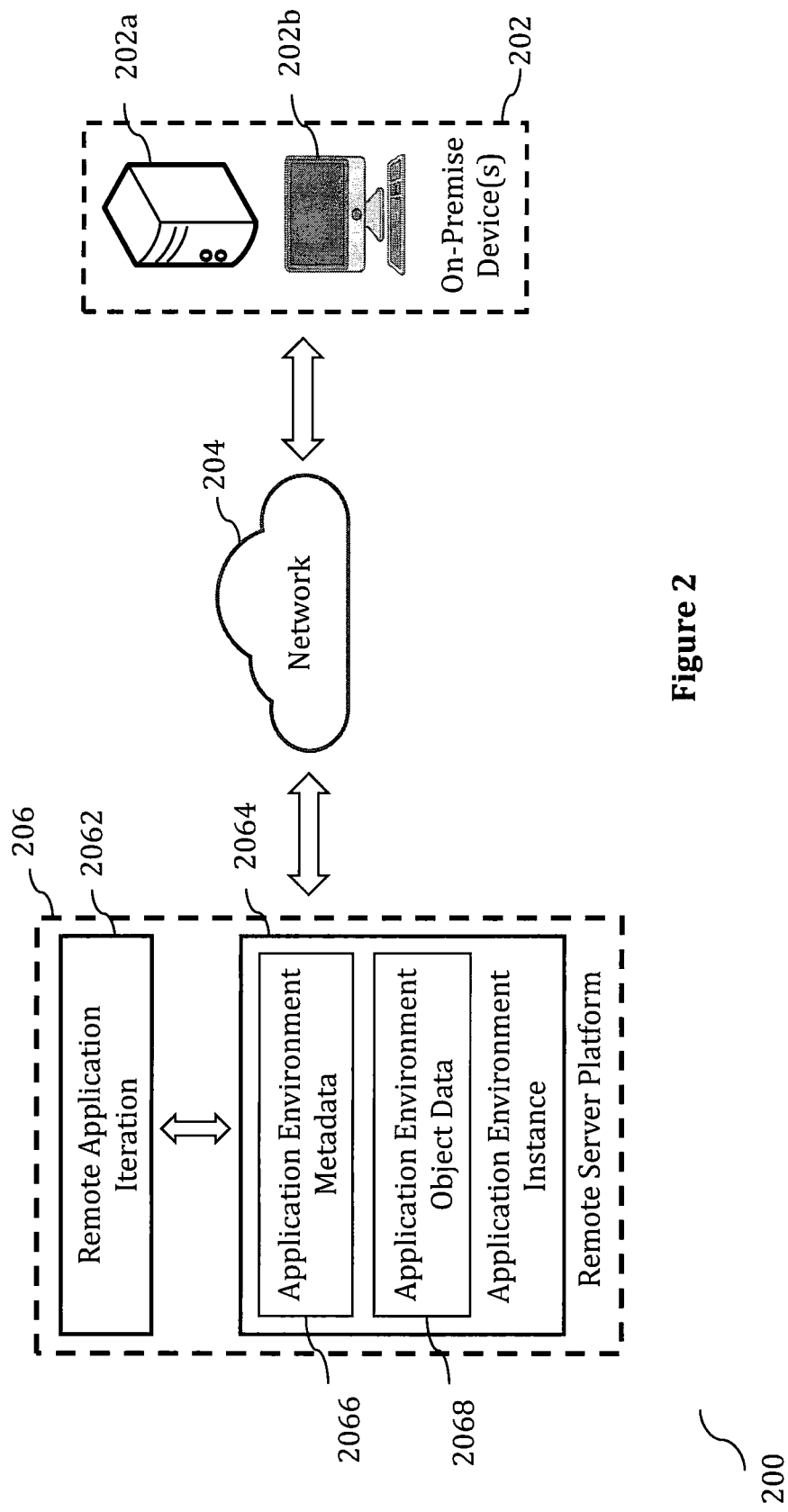
FIG. 2 illustrates an embodiment of a system environment configured in accordance with the teachings of the present invention for remote execution of client application software.

FIG. 2 illustrates an embodiment of a system environment 200 configured in accordance with the teachings of the present invention for remote execution of client application software.

System environment 200 comprises on-premise device 202, network 204 and remote server platform 206.

On-premise device 202 may comprise any server 202a and/or other computing device 202b having a client application software installed thereon, and having a corresponding application environment implemented thereon. The application environment corresponding to the client application software comprises a plurality of data objects (e.g. software data files) stored within a file system associated with the on-premise device—the one or more data objects comprising (i) application software data objects—comprising data objects that include application software code, and application software attribute data and/or (ii) user generated data objects—comprising user data associated with operations of the application software code.

Network 204 may comprise any data network that enables data communication between entities connected to the network—and may in various non-limiting embodiments include any of a local area network, wide area network, distributed data network, or internetwork such as the Internet.

Remote server platform 206 comprises at least one remote application iteration 2062 implemented on a remote server or a processor within remote server platform 206. Remote application iteration 2062 is a remote instance of a client application software that is installed on the on-premise device 202, which remote instance is being executed within remote server platform 206.

Remote server platform 206 additionally comprises an application environment instance 2064 that is generated or implemented within remote server platform 206—and more particularly within a memory within or coupled with remote server platform 206. Application environment instance 2064 is a local instance of an application environment corresponding to the remote application iteration of the client application software that is installed or running within remote server platform 206. This application environment instance 2064 within remote server platform 206 provides remote application iteration 2062 of the client application software, with access to application software data objects and user generated data objects that are required for execution of the remote application iteration 2062 at remote server platform 206.

As shown in FIG. 2, application environment instance 2064 comprises application environment metadata 2066 and application environment object data 2068. The application environment metadata 2066 and application environment object data 2068 provide remote application iteration 2026 with access to application software data objects and user generated data objects that are required for execution of the remote application iteration 2062 at remote server platform 206. It would be understood that application software data objects may comprise data objects that include application software code, application software libraries and application software data files, while user generated data objects may comprise user specific data or user generated data associated with operations of the application software code.

Application environment object data 2068 may include any one or more of data files or data records stored within a file system, one or more directories, folders or file paths within the file system, and one or more directories, folders or file paths that include any of nested data files, nested data records, nested directories or nested folders.

Application environment metadata 2066 comprises one or more data items, data elements or data records that describes attributes of a data file, data record, directory, folder, or file path within a file system. The attributes described by application environment metadata 2066 may include without limitation, one or more of file size, file location, owner and type of the file, file access permissions (e.g. read, write, execute), owner and type of the directory, file contents within a directory, date of file creation, date of last file modification, date of directory creation, date of last directory modification etc.

During execution of remote application iteration 2062 within remote server platform 206, the remote application iteration 2062 retrieves and relies on application environment object data 2068 and application environment metadata 2066 within application environment instance 2064. The application environment metadata 2066 and application environment object data 2068 is retrieved from on-premise device 202 through network 204 and is stored within remote server platform 206 (according to embodiments of the invention that are described in more detail below), for enabling execution of remote application iteration 2062. In particular embodiments, retrieval of application environment metadata 2066 and application environment object data 2068 from on-premise device 202 is controlled or implemented by remote application iteration 2062—which may be configured for network based communication with, and data retrieval from, on-premise device 202.

Figure 3A:
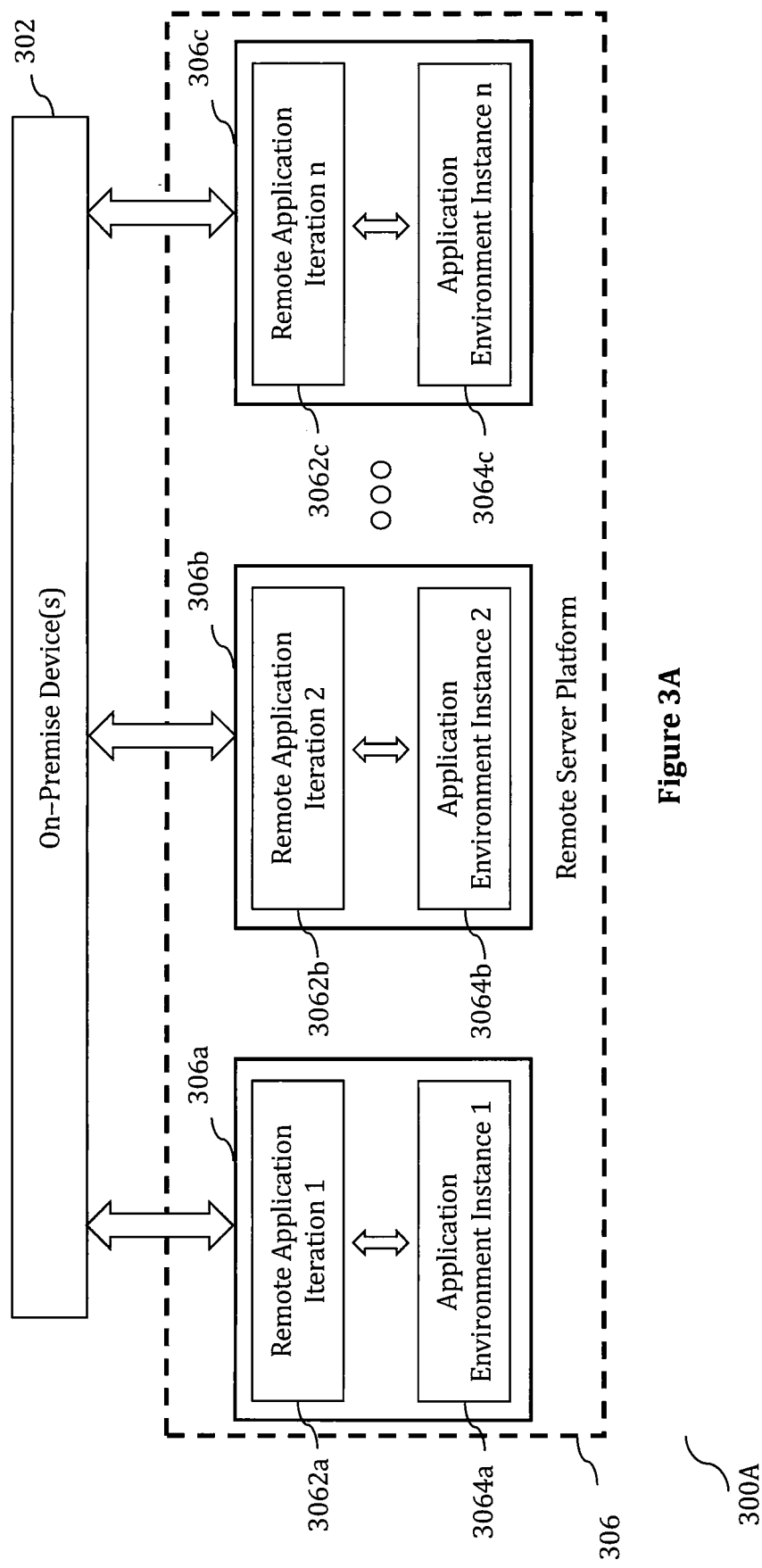
FIG. 3A illustrates another embodiment of a system environment configured in accordance with the teachings of the present invention for execution of a plurality of remote application iterations of a client application software.

In certain embodiments of the present invention, remote server platform 206 enables execution of a plurality of remote application iterations corresponding to a client software application, on one or more remote servers or processors within remote server platform 206. FIG. 3A illustrates an embodiment of a system environment 300A configured in accordance with the teachings of the present invention for remote execution of a plurality of remote application iterations corresponding to a client application software.

System environment 300A comprises on-premise device 302, and remote server platform 306 that are communicatively coupled with each other through one or more communication networks (not shown in the Figure).

As in the case of system environment 200, on-premise device 302 within system environment 300A may comprise any server and/or other computing device having a client application software installed thereon, and having a corresponding application environment implemented thereon.

In the embodiment of FIG. 3A, remote server platform 306 is configured to remotely execute n remote iterations of a client software application—wherein each remotely executed iteration within remote server platform 306 comprises an implementation of a remote application iteration and a corresponding application environment instance. In system environment 300A, a first remote iteration 306a of the client software application comprises remote application iteration 1 (3062a) and a corresponding application environment instance 1 (3064a), a second remote iteration 306b of the client software application comprises remote application iteration 2 (3062b) and a corresponding application environment instance 2 (3064b), upto an nth remote iteration 306c of the client software application which comprises remote application iteration n (3062c) and a corresponding application environment instance n (3064c).

As discussed above in connection with FIG. 2, each remote application iteration 3062a, 3062b and 3062c is a remote executed instance of a client application software that is installed on on-premise device 302 that is being executed within remote platform server 306.

Additionally, each of remote application iterations 1 to n (3062a, 3062b and 3062c) has a corresponding application environment instance 1 to n (3064a, 3064b, 3064c) that is generated for and coupled with said remote application iteration. The application environment instances 1 to n (3064a, 3064b, 3064c) are stored within a memory within or coupled with remote server platform 306. Each application environment instance 1 to n (3064a, 3064b, 3064c) provides its respective remote application iteration 1 to n (3062a, 3062b, 3062c) of the client application software, with access to application software data objects and user generated data objects that are required for execution of the remote application iterations 1 to n (3062a, 3062b, 3062c) at remote server platform 306.

While not specifically illustrated in FIG. 3A, each, application environment instance 1 to n (3064a, 3064b, 3064c) comprises application environment metadata and application environment object data of the type described above in connection with FIG. 2.

During execution of each remote application iteration 1 to n (3062a, 3062b, 3062c) within remote server platform 306, each of the remote application iterations 1 to n retrieves and relies on application environment object data and application environment metadata within the corresponding application environment instance 1 to n (3064*a*, 3064*b*, 3064*c*). The application environment metadata and application environment object data is retrieved from on-premise device 302 and is stored within remote server platform 306 according to embodiments of the invention that are described in more detail below, for the purposes of enabling execution of remote application iterations 1 to n (3062*a*, 3062*b*, 3062*c*). In particular embodiments of the invention, retrieval of application environment metadata and application environment object data from on-premise device 302 is controlled or implemented by the concerned remote application iteration 1 to n (3062*a*, 3062*b*, 3062*c*)—which may be configured for network based communication with, and data retrieval from, on-premise device 302.

In embodiments of the invention where system environment 300A is used for remote execution of a plurality of remote application iterations 1 to n (3062*a*, 3062*b*, 3062*c*) corresponding to a client application software, the system environment may rely on one or more data records to correlate client application software that is being remotely executed, with the plurality of running remote application iterations 1 to n (3062*a*, 3062*b*, 3062*c*), and with their respective application environment instances 1 to n (3064*a*, 3064*b*, 3064*c*), and additionally with the user that has initiated or is controlling the plurality of running remote application iterations 1 to n (3062*a*, 3062*b*, 3062*c*).

FIG. 3B illustrates an exemplary data structure 300B of a type that may be used to generated data records of the kind described above, that may be used to correlate client application software that is being remotely executed, with the plurality of running remote application iterations.

As shown in FIG. 3B, exemplary data structure 300B comprises data fields 308 to 316.

Data field 308 is used to store a User ID associated with a particular remote application iteration that is being executed within system environment 300A. The User ID comprises a unique identifier associated with a user or a user account associated with the system environment 300A and which user or user account is responsible for or controls the execution of the corresponding one or more running or stored remote application iterations 3062*a*, 3062*b*, 3062*c* corresponding to a client application software within system environment 300A.

Data field 310 is used to store an Application ID associated with a particular remote application iteration that is being executed within system environment 300A. The Application ID comprises a unique identifier associated with the client application software, remote application iteration(s) whereof are being executed within system environment 300A.

Data field 312 is used to store a Remote Application Iteration ID for each remote application iteration that is being executed within system environment 300A. The Remote Application Iteration ID comprises a unique identifier associated with a specific remote application iteration corresponding to a client application software that is being executed within system environment 300A.

Data field 314 is used to store an Environment Instance ID associated with a particular remote application iteration that is being executed within system environment 300A. The Environment Instance ID comprises a unique identifier associated with a specific application environment instance that is generated for and coupled with a particular remote application iteration.

Data field 316 is used to store on-premise application information corresponding to a particular remote application iteration that is being executed within system environment 300A. The on-premise application information may comprise any information, network addresses, storage addresses, and/or other data location pointers, describing an on-premise device at which the on-premise client application software is installed, an application environment within the on-premise device that corresponds to the client application software, and/or one or more data objects corresponding to the client application software that are stored within said application environment.

It would be understood that each remote application iteration 3062*a*, 3062*b*, 3062*c* executed within system environment 300A would have a corresponding data record of the type discussed in connection with FIG. 3B, wherein the data record would store the User ID, Application ID, Remote Application Iteration ID and Environment Instance ID corresponding to said remote application iteration. The data elements within said data record would enable processing entities within system environment 300A to correlate and appropriately retrieve and transmit data records and data messages between remote application iterations and their corresponding remote application environment instances, and a corresponding client application software or application environment that is implemented within an on-premise device—to enable execution of each such remote application iteration.

Figure 4:
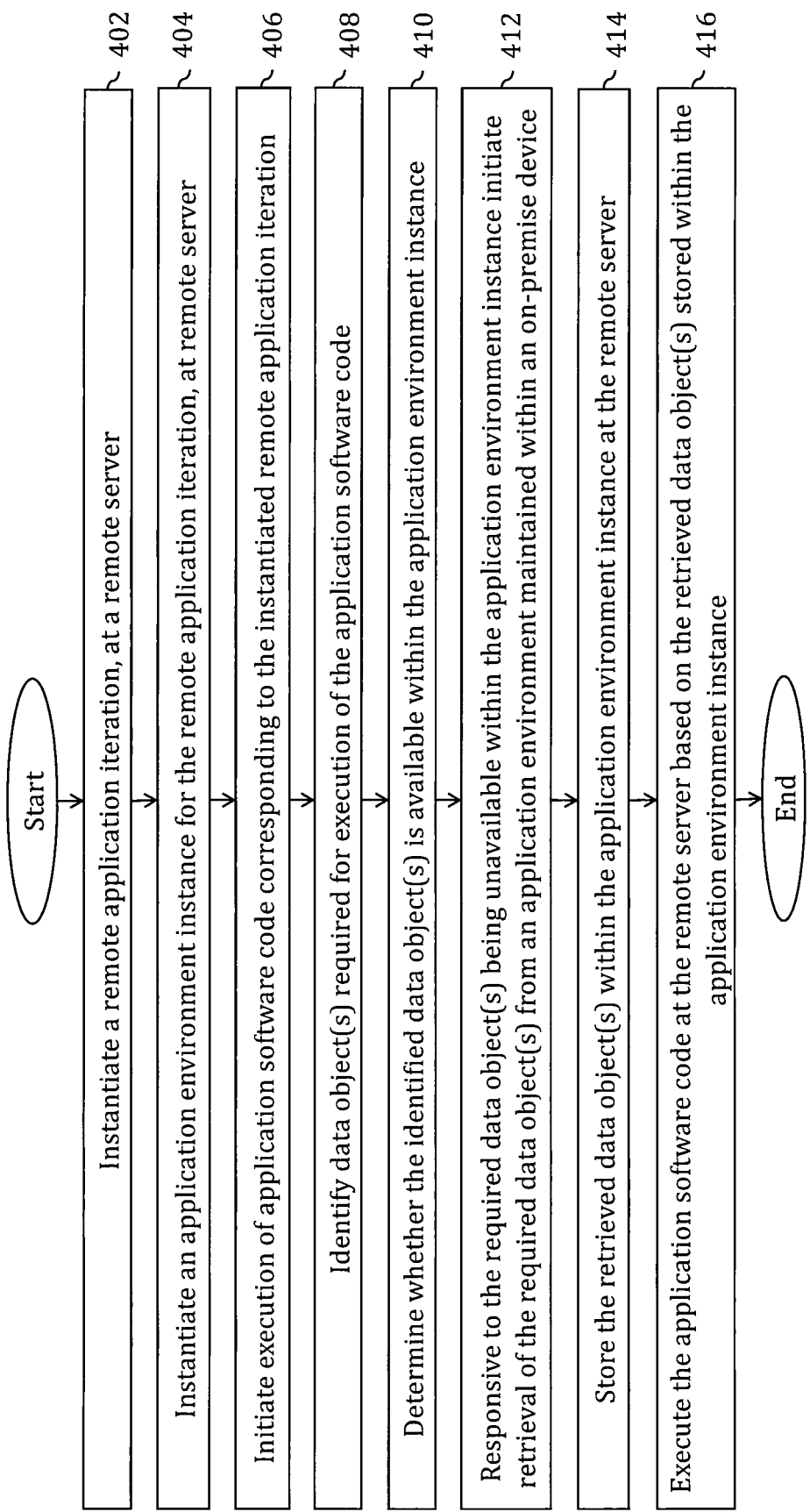
FIG. 4 is a flowchart illustrating a method of executing a remote application iteration of a client software application at a remote server platform based on dynamic retrieval of data from an on-premise device.

FIG. 4 is a flowchart illustrating a method of executing a remote iteration of a client software application at a remote server platform based on dynamic retrieval of data from an on-premise device for provisioning an instance of a client software application environment maintained at the remote server platform. The method of FIG. 4 may be implemented partially or wholly within a remote server within a remote server platform (206, 306) of the type illustrated in FIGS. 2 and 3A.

Step 402 comprises instantiation of a remote application iteration at a remote server. The remote server may comprise a server within a remote server platform 206, 306 within system environment 200, 300A. The remote application iteration at the remote server may be instantiated in response to receiving an instruction (for example a user instruction or a system instruction) for instantiation. In a particular embodiment, the instruction for instantiation may include one or more of (i) information identifying the client software application for which a remote application iteration is intended to be run (for example, by way of an Application ID), (ii) information identifying a specific on-premise instance of a client software application and/or corresponding application environment, to which the remote application iteration corresponds, (iii) information identifying a user or user account instantiating or controlling the remote application iteration, and/or (iv) information identifying or describing an on-premise device at which the on-premise client application software is installed.

Step 404 comprises instantiating or generating at the remote server, an application environment instance corresponding to the remote application iteration that has been instantiated at step 402.

Step 406 comprises initiating at the remote server, execution of application software code corresponding to the remote application iteration instantiated at step 402. In an embodiment of the method, the application software code under execution may be retrieved from a memory associated with or communicably coupled with the remote server.

Step 408 comprises identifying one or more data object(s) required by the application software code under execution. In a particular embodiment identification of the one or more data object(s) occurs after execution of the application software code has been initiated at step 406. The identified data object(s) may comprise one or more software data files required for execution of the application software code. As discussed above, the data objects may further comprise (i) application software data objects—comprising data objects that include application software code, application software libraries and application software data files, and/or (ii) user generated data objects—comprising user specific data or user generated data associated with operations of the application software code.

In a preferred embodiment, the identification of data object(s) at step 408 is an event based (or "dynamic") identification. The identification of data object(s) required for execution of the application software code may be achieved in multiple ways. In one embodiment, identification of a required data object is based on receiving from the application software code under execution, an application call, or application request or application data message requesting the data object. In another embodiment, identification of one or more data object(s) required for execution of the application software code may be a predictive identification—wherein the required data object(s) are identified based on predictive methods or algorithms, in advance of (or prior to) receiving (from the application software code under execution), an application call, or application request or application data message requesting the data object. In yet another embodiment, the identification of one or more data object(s) required for execution of the application software code may be a rule and event based identification—wherein the required data object(s) are identified based on detection of one or more events or one or more changes in data state, and the required data object(s) are identified based on one or more rules, indicia or heuristics that associate the detected event(s) or change(s) in state with one or more data object(s) that would be required for execution of the application software code.

Step 410 comprises determining whether the required data object(s) is/are available for retrieval within the application environment instance corresponding to the remote application iteration, that has been instantiated at step 404 (i.e. the application environment instantiated at the remote server).

In response to determining that the required data object(s) is/are not available for retrieval within the application environment instance corresponding to the remote application iteration, that has been instantiated at step 404—step 412 comprises initiating retrieval of the required data object(s) from an application environment maintained within an on-premise device at which a local instance of the client software application and corresponding data object(s) are available. In an embodiment, the on-premise device may be identified by the remote server, based on information received at step 402 or based on information extracted from the application software code under execution, or based on information received from the remote application iteration.

Step 414 comprises storing the data object(s) that has been retrieved from the on-premise device (at step 412), within the application environment instance that has been instantiated at step 404.

Step 416 comprises executing the application software code at the remote server, based on the one or more data object(s) that have been retrieved at step 412 and that are stored within the relevant application environment instance at step 414.

Figure 5:
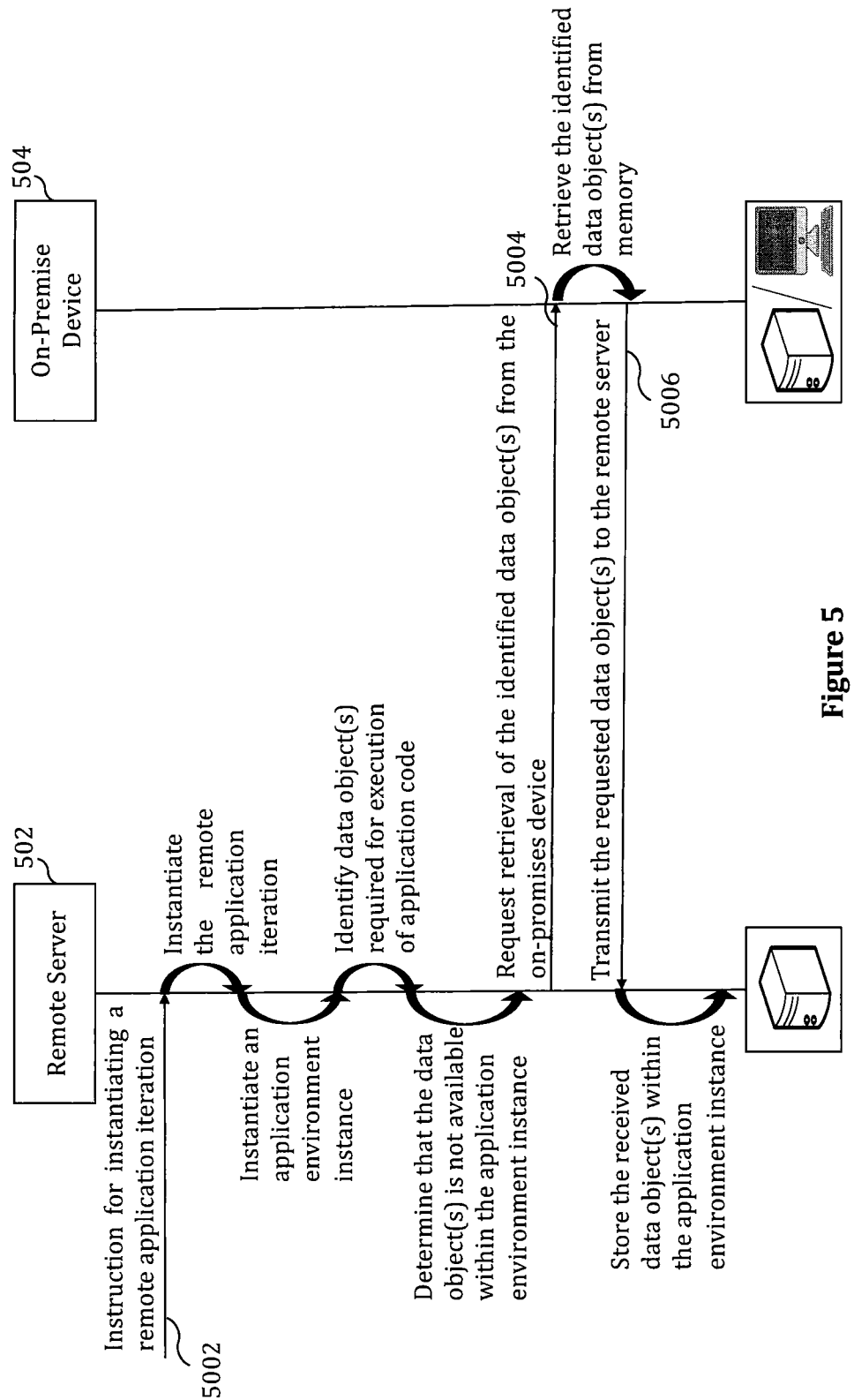
FIG. 5 is a communication flow diagram illustrating communication flow between system entities involved in implementing the method of FIG. 4.

FIG. 5 is a communication flow diagram illustrating communication flow between system entities involved in implementing the method of FIG. 4.

At step 5002, remote server 502 receives an instruction for instantiating a remote application iteration at remote server 502. As discussed above, the instruction for instantiation may include one or more of (i) information identifying the client software application for which a remote application iteration is intended to be run (for example, by way of an Application ID), (ii) information identifying a client software application and/or corresponding application environment that is implemented within an on-premise device, and to which the remote application iteration corresponds, (iii) information identifying a user or user account instantiating or controlling the remote application iteration, and/or (iv) information identifying or describing an on-premise device at which the on-premise client application software is installed.

Responsive to receiving the instruction, remote server 502 (i) instantiates the remote application iteration, (ii) instantiates an application environment instance corresponding to this remote application iteration, and (iii) identifies one or more data object(s) required for execution of application software code corresponding to the remote application iteration that has been instantiated. As shown in FIG. 5, remote server 502 thereafter determines that the identified one or more data object(s) are not available within the application environment instance that corresponds to the remote application environment under execution.

Responsive to this determination, at step 5004, remote server 502 transmits to on-premise device 504, a request for retrieval of the identified data object(s). On-premise device 504 may comprise a device at which a local instance of the client software application that corresponds to the remote application iteration, is available. In an embodiment, on-premise device 504 may be identified by remote server 502 based on information within the request received at step 5002, or based on information extracted from the application software code under execution, or based on information received from the remote application iteration.

On-premise device 504 responds to the received request by retrieving the identified data object(s) from a memory associated or coupled with on-premise device 504. Step 5006 thereafter comprises transmitting the requested data object(s) from on-premise device 504 to remote server 506.

Remote server 502 stores the data object(s) that has been transmitted at step 5006, and may subsequently use such data object(s) for executing application software code corresponding to the remote application iteration, at remote server 502.

Figure 6:
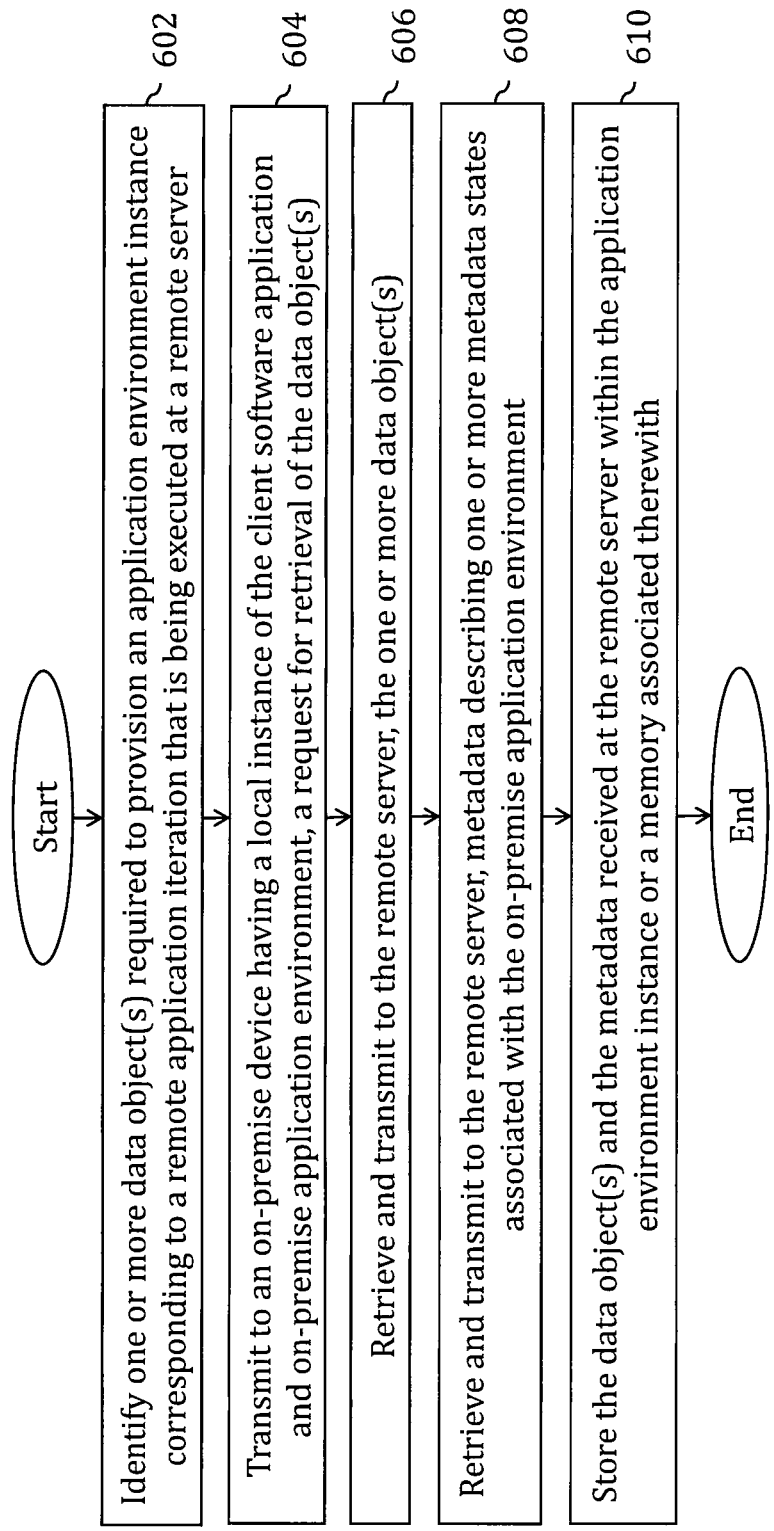
FIG. 6 is a flowchart illustrating a method for dynamic retrieval of data from an on-premise device for provisioning an instance of a client software application environment maintained at a remote server platform.

FIG. 6 is a flowchart illustrating a method for dynamic retrieval of data or data object(s) from an on-premise device for provisioning an instance of a client software application environment maintained at a remote server platform. It would be understood that the method of dynamic retrieval of data as illustrated in FIG. 6 may be used for the purposes of implementing the method more generally described and illustrated above, in connection with FIGS. 4 and 5.

Step 602 of FIG. 6 comprises identifying, at a remote server one or more data object(s) required for provisioning an application environment instance corresponding to a remote application iteration that is being executed at the remote server (in accordance with the method of FIG. 4). As discussed in connection with step 408 of FIG. 4, in certain embodiments, the identified data object(s) may comprise one or more software data files required for execution the application code. As discussed above, the identified data object(s) may further comprise (i) application software data objects—comprising data objects that include application software code, application software libraries and application software data files, and/or (ii) user generated data objects—comprising user specific data or user generated data associated with operations of the application software code.

Additionally, as discussed in connection with step 408 of FIG. 4, the identification of data object(s) at step 602 may be an event based (or "dynamic") identification, and may include any of (i) identification of a required data object based on receiving from the application software code under execution, an application call, or application request or application data message requesting the data object, (ii) identification of one or more data object(s) by predictive identification—wherein the required data object(s) are identified based on predictive methods or algorithms, in advance of (or prior to) receiving (from the application software code under execution), an application call, or application request or application data message requesting the data object, and (iii) identification of one or more data object(s) by way of a rule and event based identification—wherein the required data object(s) are identified based on detection of one or more events or one or more changes in data state, and the required data object(s) are identified based on one or more rules, indicia or heuristics that associate the detected event(s) or change(s) in state with one or more data object(s) that would be required for execution of the application software code.

Step 604 comprises transmitting, from the remote server to an on-premise device, at which a local instance of the client software application and a corresponding on-premise application environment are maintained, a request for retrieval of the data object(s) identified at step 602. In an embodiment, the request for retrieval may be transmitted to the on-premise device in response to a prior determination that the required data object(s) is/are not available for retrieval within the application environment instance corresponding to the remote application iteration, that is being executed at the remote server.

Step 606 comprises retrieving at the on-premise device, and thereafter transmitting to the remote server, the requested one or more data object(s). In an embodiment, the one or more data object(s) are retrieved from a memory associated or coupled with the on-premise device. In another embodiment, the one or more data object(s) are retrieved from an on-premise application environment corresponding to the local instance of the concerned client application software that is maintained at the on-premise device.

Step 608 comprises additionally retrieving from the on-premise device, and thereafter transmitting to the remote server, metadata describing one or more data states associated with the on-premise application environment corresponding to the local instance of the concerned client application software that is maintained at the on-premise device. The metadata retrieved and transmitted at step 608 is application environment metadata—i.e. one or more data items, data elements or data records that describe attributes of a data file, data record, directory, folder, or file path within a file system. The attributes described by application environment metadata may include one or more of file size, file location, owner and type of the file, file access permissions (e.g. read, write, execute), owner and type of the directory, file contents within a directory, date of file creation, date of last file modification, date of directory creation, date of last directory modification etc.

In an embodiment of the method of FIG. 6, the metadata retrieved at step 608 is application environment metadata that is identified and selected for transmission, based on the one or more data object(s) that have been retrieved and transmitted to the remote server at step 606. In a more particular embodiment, the metadata retrieved at step 608 is application environment data associated with a file system directory or file system folder within a memory associated or coupled with the on-premise device, from which directory or folder at least one of the data object(s) transmitted at step 606 have been retrieved. In a yet more particular embodiment, the metadata retrieved at step 608 is application environment data associated with each file system directory or file system folder of the on-premise device from which the data object(s) transmitted at step 606 have been retrieved.

Step 610 comprises storing the data object(s) and the metadata received from the on-premise device, within the application environment instance that is being provisioned, and/or within a memory that is within or communicably coupled with the remote server and which memory is linked with, associated with or allocated to the application environment instance that is being provisioned at the remote server.

The data object(s) stored at step 610 may thereafter be used for executing application software code corresponding to the remote application iteration that is being executed at the remote server (as discussed above in connection with step 416 of FIG. 4).

The utilization of the metadata stored at step 610 for achieving the objectives of the invention is discussed in more detail below, in connection with FIGS. 10 and 11.

Figure 7:
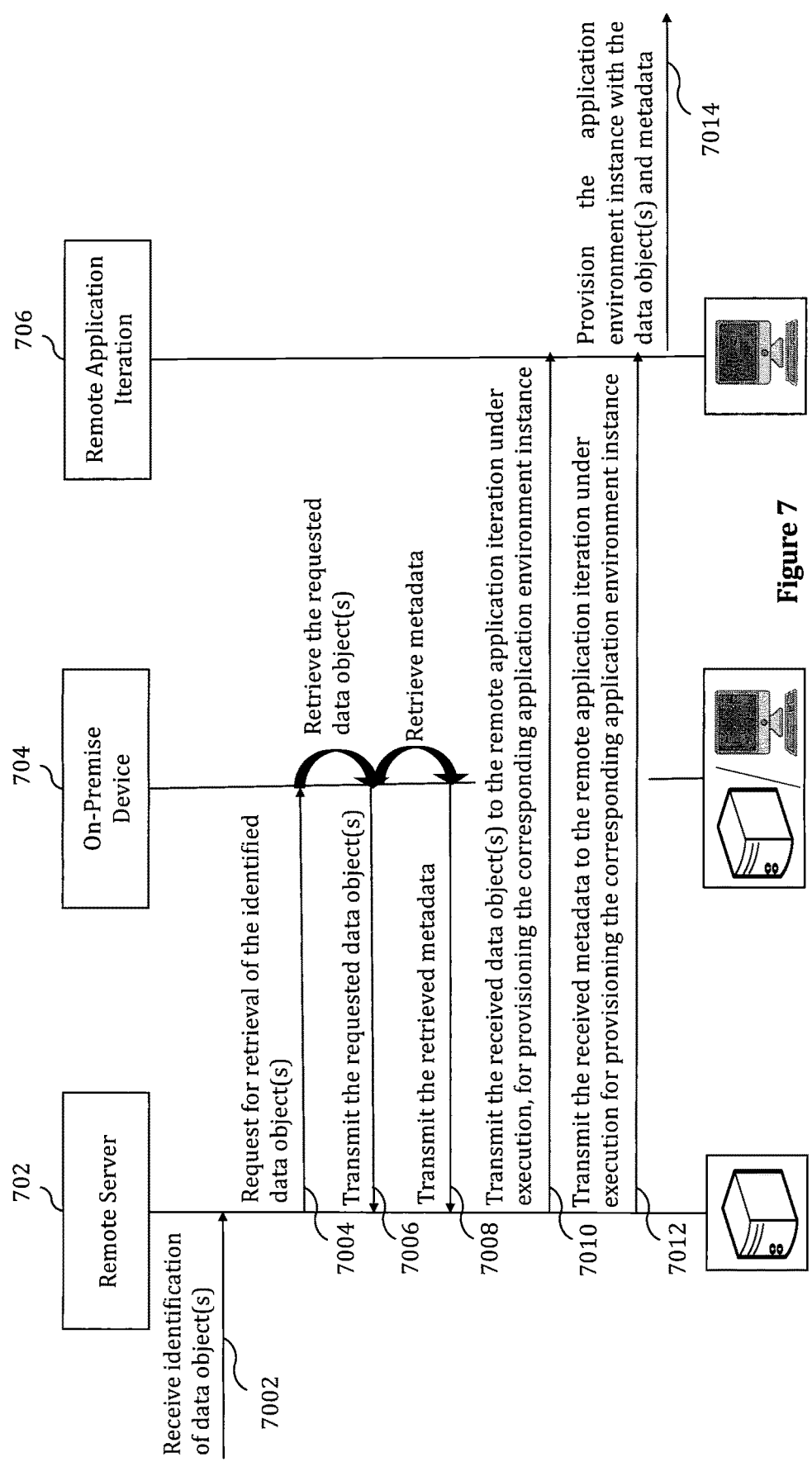
FIG. 7 is a communication flow diagram illustrating communication flow between system entities involved in implementing the method of FIG. 6.

FIG. 7 is a communication flow diagram illustrating communication flow between system entities involved in implementing the method of FIG. 6.

Step 7002 of FIG. 7 comprises receiving at remote server 702, an instruction, input, or data message identifying one or more data object(s) that are required for provisioning an application environment instance corresponding to a remote application iteration that is being executed at the remote server. The identified data object(s) may comprise one or more software data files required for execution of the application software code. The identified data object(s) may further comprise (i) application software data objects—comprising data objects that include application software code, application software libraries and application software data files, and/or (ii) user generated data objects—comprising user specific data or user generated data associated with operations of the application software code.

At step 7004, remote server 702 transmits to on-premise device 704 (at which a local instance of the client software application and a corresponding on-premise application environment are maintained), a request for retrieval of the data object(s) identified at step 7002. In an embodiment, the request for retrieval may be transmitted to the on-premise device 704 in response to a prior determination that the required data object(s) is/are not available for retrieval within the application environment instance corresponding to the remote application iteration, that is being executed at the remote server.

On-premise device 704 retrieves the requested one or more data object(s) from a memory associated or coupled with the on-premise device. In another embodiment, the one or more data object(s) are retrieved from the on-premise application environment corresponding to the local instance of the concerned client application software. Thereafter, step 7006 comprises transmitting from on-premise device 704 to remote server 702, the requested one or more data object(s).

On-premise device 704 additionally retrieves from a memory within or communicably coupled therewith, metadata describing one or more data states associated with the on-premise application environment corresponding to the local instance of the concerned client application software.

At step 7008, the retrieved metadata is transmitted from on-premise device 704 to remote server 702. As discussed above (in connection with FIG. 6), the metadata retrieved and transmitted at step 7008 is application environment metadata—i.e. one or more data items, data elements or data records that describes attributes of a data file, data record, directory, folder, or file path within a file system. The attributes described by application environment metadata may include one or more of file size, file location, owner and type of the file, file access permissions (e.g. read, write, execute), owner and type of the directory, file contents within a directory, date of file creation, date of last file modification, date of directory creation, date of last directory modification etc.

In a particular embodiment, the metadata transmitted at step 7008 is application environment metadata that is identified and selected for transmission, based on the one or more data object(s) that have been retrieved and transmitted to the remote server at step 7006. In a more particular embodiment, the metadata transmitted at step 7008 is application environment data associated with a file system directory or file system folder within a memory associated or coupled with the on-premise device, from which directory or folder at least one of the data object(s) transmitted at step 7006 have been retrieved. In a yet more particular embodiment, the metadata transmitted at step 7008 is application environment data associated with each file system directory or file system folder of the on-premise device from which the data object(s) transmitted at step 7006 have been retrieved.

Step 7010 comprises transmitting from remote server 702 to the remote application iteration 706 that is under execution, the data object(s) received at step 7006. Said data object(s) are transmitted for the purposes of provisioning the application environment instance corresponding to the remote application environment 706 that is under execution at remote server 702.

Step 7012 comprises transmitting from remote server 702 to the remote application iteration 706 that is under execution, the metadata received at step 7008—for the purposes of provisioning the application environment instance corresponding to the remote application environment 706 that is under execution at remote server 702.

Step 7014 comprises remote application iteration 706 provisioning the application environment instance that is associated with remote application iteration 706, with the received data object(s) and metadata.

Figure 8:
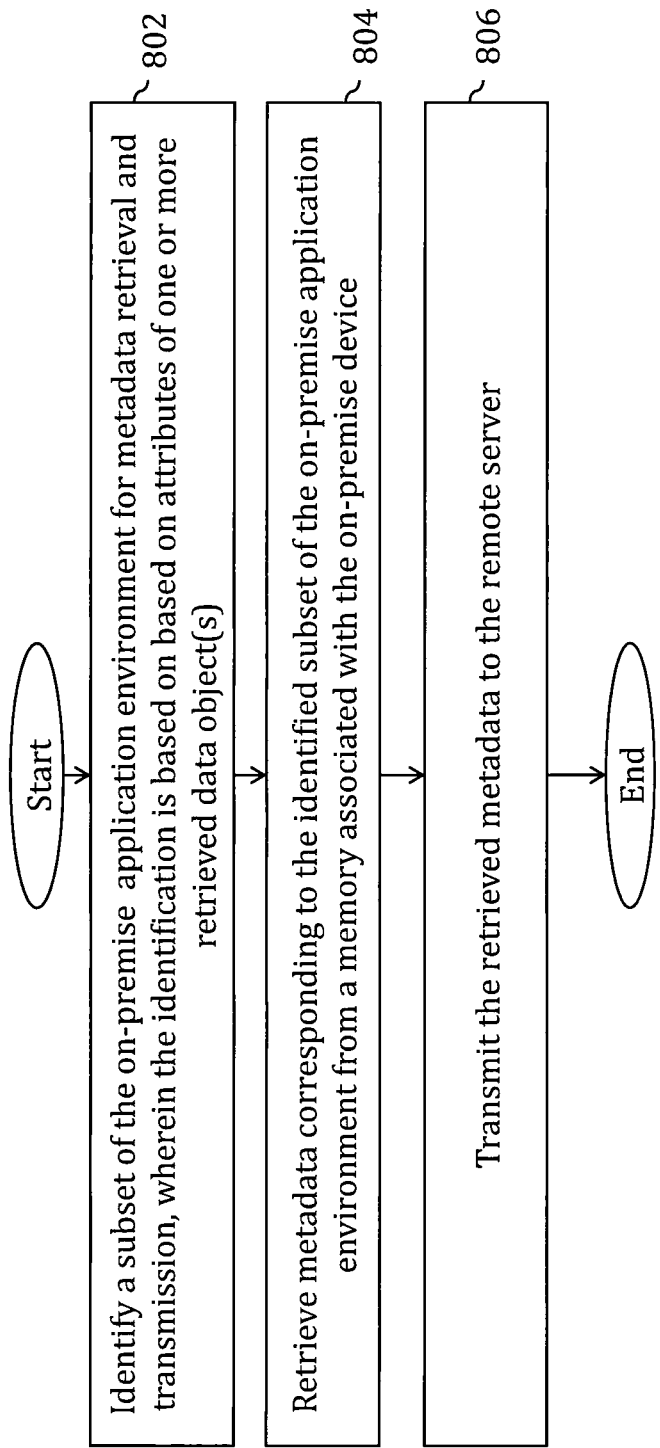
FIG. 8 is a flowchart illustrating a method for identifying metadata and retrieving metadata from an on-premise device for provisioning an instance of a client software application environment maintained at a remote server platform.

FIG. 8 is a flowchart illustrating a method for identifying metadata and retrieving metadata from an on-premise device for provisioning an instance of a client software application environment maintained at a remote server platform. It would be understood that the method of FIG. 8 is implemented partially or wholly within an on-premise device from which a remote server seeks to retrieve data object(s) for provisioning an application environment instance corresponding to a remote application iteration that is under execution at the remote server. It will further be noted that in certain embodiments of the invention, the method of FIG. 8 may be used to implement step 608 of FIG. 6.

Step 802 comprises identifying at an on-premise device, a subset of the on-premise application environment for metadata retrieval and transmission. The on-premise device is the device from which one or more data object(s) have been requested by a remote application iteration that is being executed at a remote server, The identification of the subset of the on-premise application environment within the on-premise device, is based on attributes of the one or more data object(s) that have been requested by the remote application iteration. Said one or more data object(s) may already have been retrieved and transmitted from the on-premise device to the remote server. In a particular embodiment, the sub-set of the on-premise application environment that is identified comprises a file system directory or file system folder within a memory associated or coupled with the on-premise device, and from which directory or folder at least one of the data object(s) (that have been requested by the remote application iteration) have been retrieved.

Step 804 comprises retrieving metadata corresponding to the identified subset of the on-premise application environment, from a memory associated with the on-premise device. In an embodiment, the retrieved metadata may include one or more of file size, file location, file access permissions (e.g. read, write, execute, delete), file contents within a directory, date of file creation, date of last file modification, date of directory creation, date of last directory modification etc., corresponding to the identified subset of the on-premise application environment. In a further embodiment, the retrieved data includes one or more of file size, file location, file access permissions (e.g. read, write, execute, delete), file contents within a directory, date of file creation, date of last file modification, date of directory creation, date of last directory modification etc., corresponding to files and/or sub-directories or sub-folders within a file system directory or file system folder within a memory associated or coupled with the on-premise device. The directory or folder may comprise a directory or folder from which at least one of the data object(s) (that have been requested by the remote application iteration) have been retrieved.

Step 806 comprises transmitting the retrieved metadata from the on-premise device to the remote server.

Figure 9:
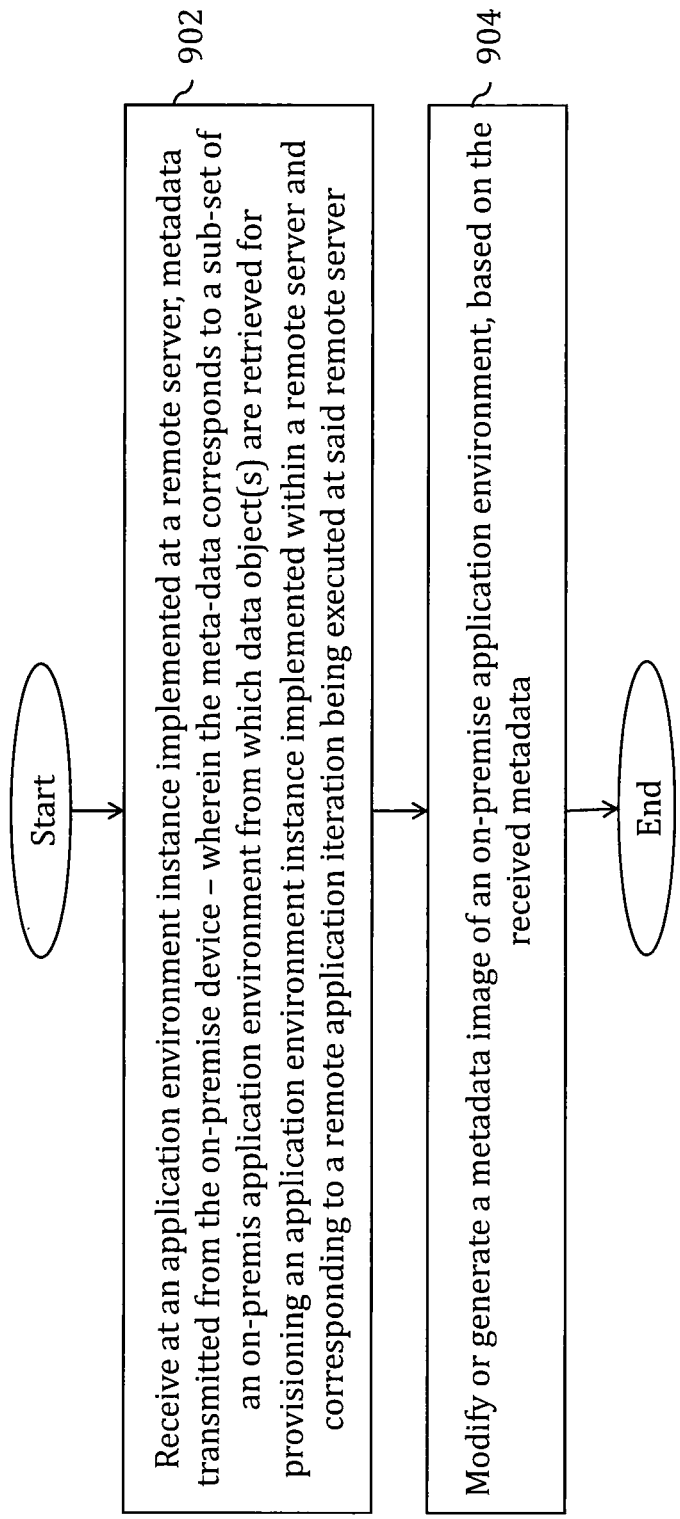
FIG. 9 is a flowchart illustrating a method for generating a metadata image of an on-premise application environment, for provisioning an instance of a client software application environment maintained at a remote server platform.

FIG. 9 is a flowchart illustrating a method for generating a metadata image of an on-premise application environment, for provisioning an instance of a client software application environment maintained at a remote server platform. The method of FIG. 9 may be implemented entirely or partially at a remote server at which a remote application iteration is under execution in accordance with the method of FIG. 4. In an embodiment, the method of FIG. 9 may be used to implement method step 610 of FIG. 6.

Step 902 comprises receiving, at an application environment instance implemented within the remote server, metadata transmitted from an on-premise device. The received metadata is metadata that has been transmitted to the remote server from the on-premise device in accordance with the method of FIG. 8. The received metadata corresponds to a subset of the on-premise application environment from which data object(s) have been retrieved for provisioning of an application environment instance that is implemented within the remote server, and which application environment instance corresponds to a remote application iteration being executed at the remote server.

Step 904 comprises modifying or generating (at the remote server) a metadata image of the on-premise application environment, based on the received metadata. In one embodiment, where the remote server does not have a previously generated metadata image of the on-premise application environment, the received metadata may be used to generate a new metadata image and store it within the application environment instance that corresponds to a remote application iteration being executed at the remote server. In another embodiment, where the remote server may have a previously generated metadata image of the on-premise application environment, and in which case, the received metadata may be used to modify the previously existing metadata image, or to substitute the previously existing metadata image, or to generate a second metadata image of the on-premise application environment.

The application of this modified or generated metadata image by the remote server is discussed in connection with FIG. 10 below.

Figure 10:
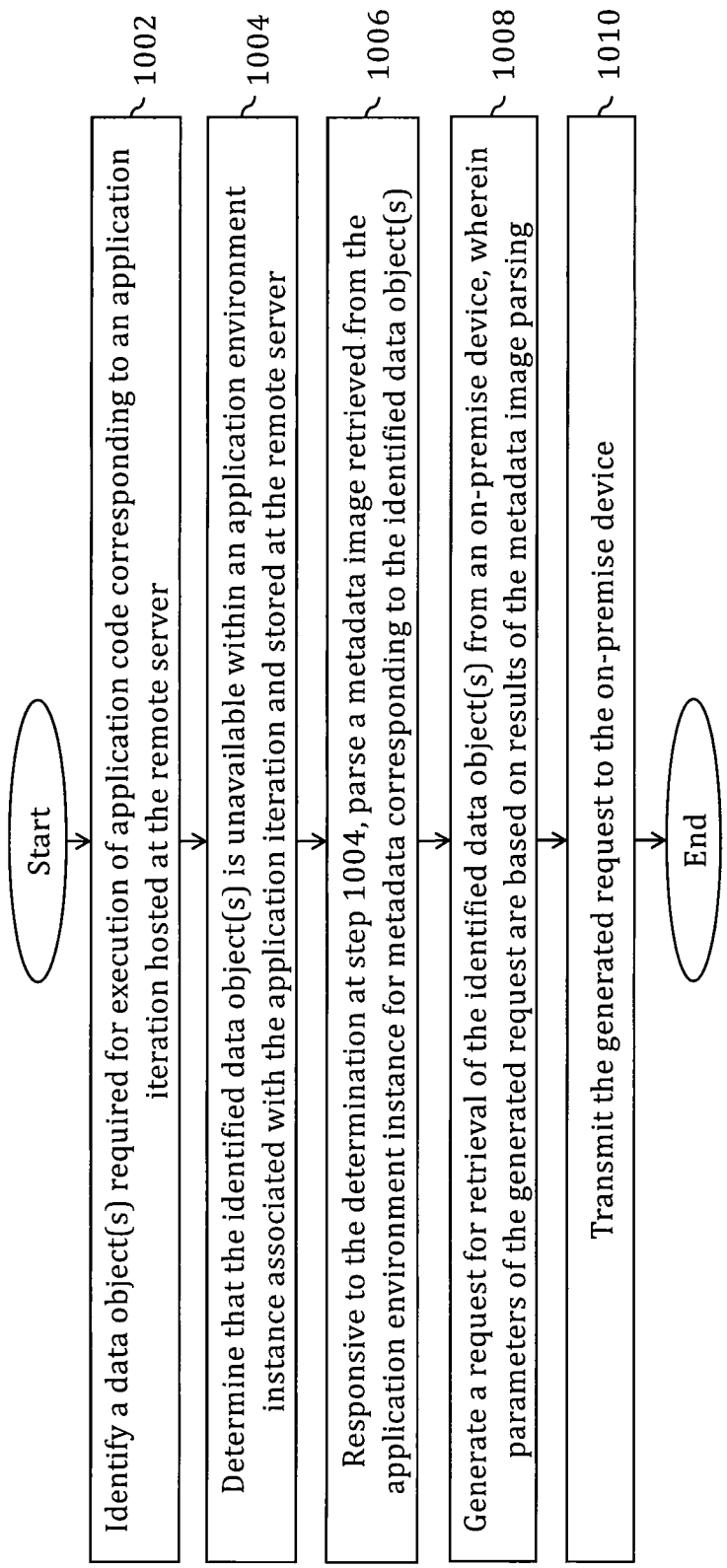
FIG. 10 is a flowchart illustrating a method for requesting from an on-premise device, retrieval of one or more data objects associated with an iteration of a client application software that is being executed at a remote server platform

FIG. 10 is a flowchart illustrating a method for requesting from an on-premise device, one or more data objects associated with a remote application iteration of a client application software that is being executed at a remote server platform. The method of FIG. 10 may be implemented entirely or partially at a remote server at which a remote application iteration is under execution in accordance with the method of FIG. 4.

Step 1002 comprises identifying at a remote server, a data object(s) required for execution of application software code corresponding to a remote application iteration that is hosted or being executed at the remote server. The identification of the data object(s) may be achieved in accordance with any of the embodiments discussed above in connection with step 408 of FIG. 4.

At step 1004, the remote server determines that the identified data object(s) is/are unavailable within an application environment instance that is stored within a memory associated with the remote server, and which corresponds to the remote application iteration.

Responsive to the determination at step 1004, step 1006 comprises parsing a metadata image retrieved from the application environment instance at the remote server, for the purpose of identifying any available metadata corresponding to the identified data object(s). It would be understood that metadata image that is parsed at step 1006 may comprise a metadata image generated in accordance with the method of FIG. 9.

The metadata corresponding to the identified data object(s) for which the metadata image is parsed may comprise any one or more data items, data elements or data records that describes attributes of the one or more data object(s) that describe the storage and/or location of the data object(s) within an on-premise device. These data object attributes may include one or more of file size, file location, owner and type of the file, file access permissions (e.g. read, write, execute), owner and type of the directory, file contents within a directory, date of file creation, date of last file modification, date of directory creation, date of last directory modification etc., corresponding to an instance or a copy of the relevant data object as stored within the on-premise device.

Step 1008 comprises generating a request for retrieval of the identified data object(s) from the on-premise device, wherein parameters of the generated request are based on metadata parsed and extracted from the metadata image at step 1006.

Step 1010 comprises transmitting the generated request for retrieval of the identified data object(s) to the on-premise device from the remote server.

Figure 11:
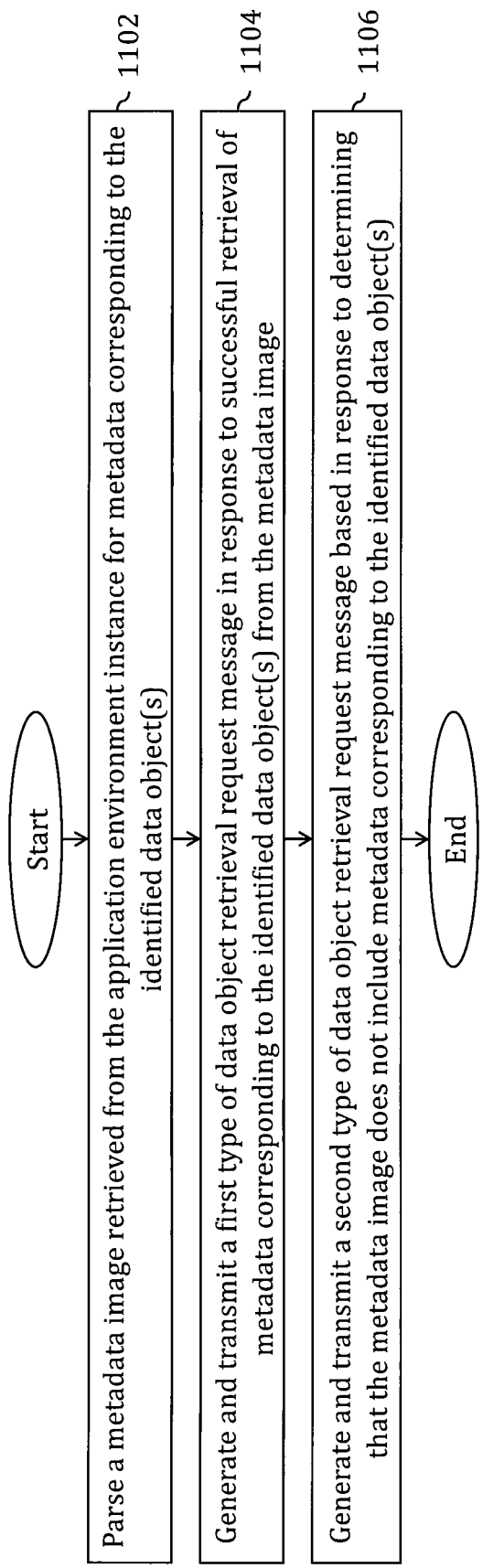
FIG. 11 is a flowchart illustrating a specific method of generating a data object retrieval request for provisioning an instance of a client software application that is being executed at a remote server.

FIG. 11 is a flowchart illustrating a specific method of generating a data object retrieval request for provisioning an instance of a client software application that is being executed at a remote server. The method of FIG. 11 may be implemented entirely or partially at a remote server at which a remote application iteration is under execution in accordance with the method of FIG. 4. It would be understood that the method of FIG. 11 may be implemented for executing method steps 1006 and 1008 described more generally in connection with FIG. 10.

Step 1102 comprises parsing a metadata image retrieved from an application environment instance stored within a remote server, for metadata corresponding to an identified data object(s) that is required by the remote server for executing a remote application iteration. The identified data object(s) are data object(s) that require to be requested from an on-premise device (as discussed in connection with step 1006 of FIG. 10).

Step 1104 comprises generating and transmitting to the on-premise device, a first type of data object retrieval request message. The first type of data object retrieval request message is generated and transmitted in response to successful retrieval of metadata corresponding to the identified data object(s) from the metadata image.

By way of further explanation, in the event the metadata image parsing at step 1102 identifies any available metadata corresponding to the required data object(s), the parameter attributes of the first type of data object retrieval request message (requesting retrieval of the identified data objects from the on-premise device) will include all or some of such metadata. These parameter attributes may thereafter be used by the on-premise device to optimally search for, retrieve and transmit the requested data object(s) to the remote server. Receiving such parameter attributes from the remote server has been found to significantly reduce the data and time overheads in the look-up and retrieval process, and has been found to make the overall process of data object retrieval from the on-premise device significantly faster and more efficient.

Alternatively, in the event parsing step 1102 does not result in identification and retrieval of metadata corresponding to the required data object(s) from the metadata image, step 1106 comprises generating and transmitting to the on-premise device, a second type of data object retrieval request message.

The second type of data object retrieval request message (requesting retrieval of the identified data objects from the on-premise device) will not include any data object attributes that describe the storage and/or location of the data object(s) within an on-premise device. In such case the on-premise device will search for and retrieve the requested data objects in a conventional manner.

The on-premise device thereafter receives the data object retrieval request message and locates and transmits the requested data object(s) back to the remote server.

While the above methods describe retrieval of data object(s) required by a remote application iteration from an on-premise device, it would be understood that in the event that a remote server has multiple remote application iterations (and multiple corresponding application environment instances) running, a data object required by a first application iteration may optionally be retrieved from an application environment instance corresponding to a second application iteration of the same client application software that is being maintained at the remote server. In such embodiments, retrieving data object(s) from a locally stored instance of an application environment instance maintained by the remote server is likely to result in further data object search and retrieval efficiencies.

Figure 12:
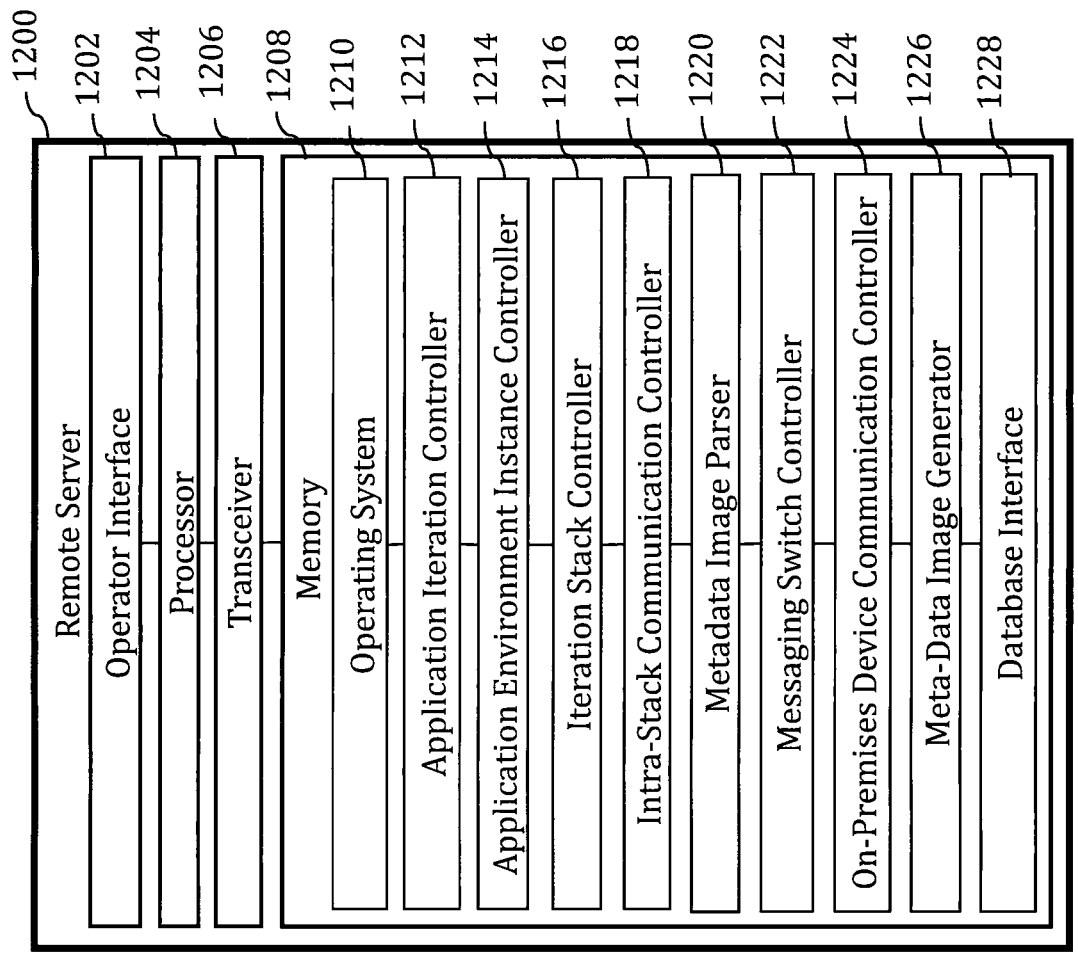
FIG. 12 illustrates an exemplary remote server configured to implement the methods of the present invention.

FIG. 12 illustrates an exemplary remote server 1200 configured to implement the methods of the present invention.

Remote server 1200 may comprise any processor based server system configured for data processing operations and network based communication. In specific embodiments, remote server 1200 may comprise one or more servers. Remote server 1200 may include (i) an operator interface 1202 configured to enable an operator to configure or control the remote server 1200, (ii) processor 1204 configured for data processing operations within remote server 1200, (iii) transceiver 1206 configured for enabling network communication to and from remote server 1200, and (iv) memory 1208, which memory 1208 may include transitory memory and/or non-transitory memory.

In an exemplary embodiment, memory 1208 may have stored therewithin, (i) an operating system 1210 configured for managing device hardware and software resources and that provides common services for software programs implemented within remote server 1200, (ii) a processor implemented application iteration controller for generating and controlling the execution of one or more remote application iterations being executed at remote server 1200 in accordance with the methods discussed above, (iii) a processor implemented application environment instance controller 1214 configured for generating and controlling storage, retrieval and modification of application environment instances stored at remote server 1200 and that are associated with each remote application iteration that is being executed or stored at remote server 1200, (iv) a processor implemented iteration stack controller configured to enable multiple remote application iterations of a client software application to be simultaneously run and stored at remote server 1200, (v) a processor implemented intra-stack communication controller 1218 that is configured to enable messaging and data object retrieval between the multiple application environment instances corresponding to multiple remote application iterations for a single client application software that are simultaneously being maintained at remote server 1200, (vi) a processor implemented metadata image parser 1220 configured to parse metadata images stored at remote server 1200 (for example in accordance with the methods of FIG. 10 or 11 described above), (vii) a processor implemented messaging switch controller 1222 configured for switching between generation of first and second types of data object retrieval messages (in accordance with the methods discussed above in connection with FIG. 11), (viii) a processor implemented on-premise device communication controller 1224 configured to enable remote server 1200 to communicate with and retrieve data objects from on-premise device(s) (for example in accordance with the method of FIG. 4), (ix) a processor implemented metadata image generator 1226 configured to generate or modify metadata images in accordance with the methods of FIGS. 8 and 9, and (x) a processor implemented database interface 1228 configured to enable processor 1204 to interface with, and retrieve data objects or metadata from stored application environment instances corresponding to the one or more remote application iterations being implemented or executed at remote server 1200.

It will be understood that remote server 1200 may be configured to implement one or more of the methods steps and process flows discussed above in connection with FIGS. 4 to 11.

Figure 13:
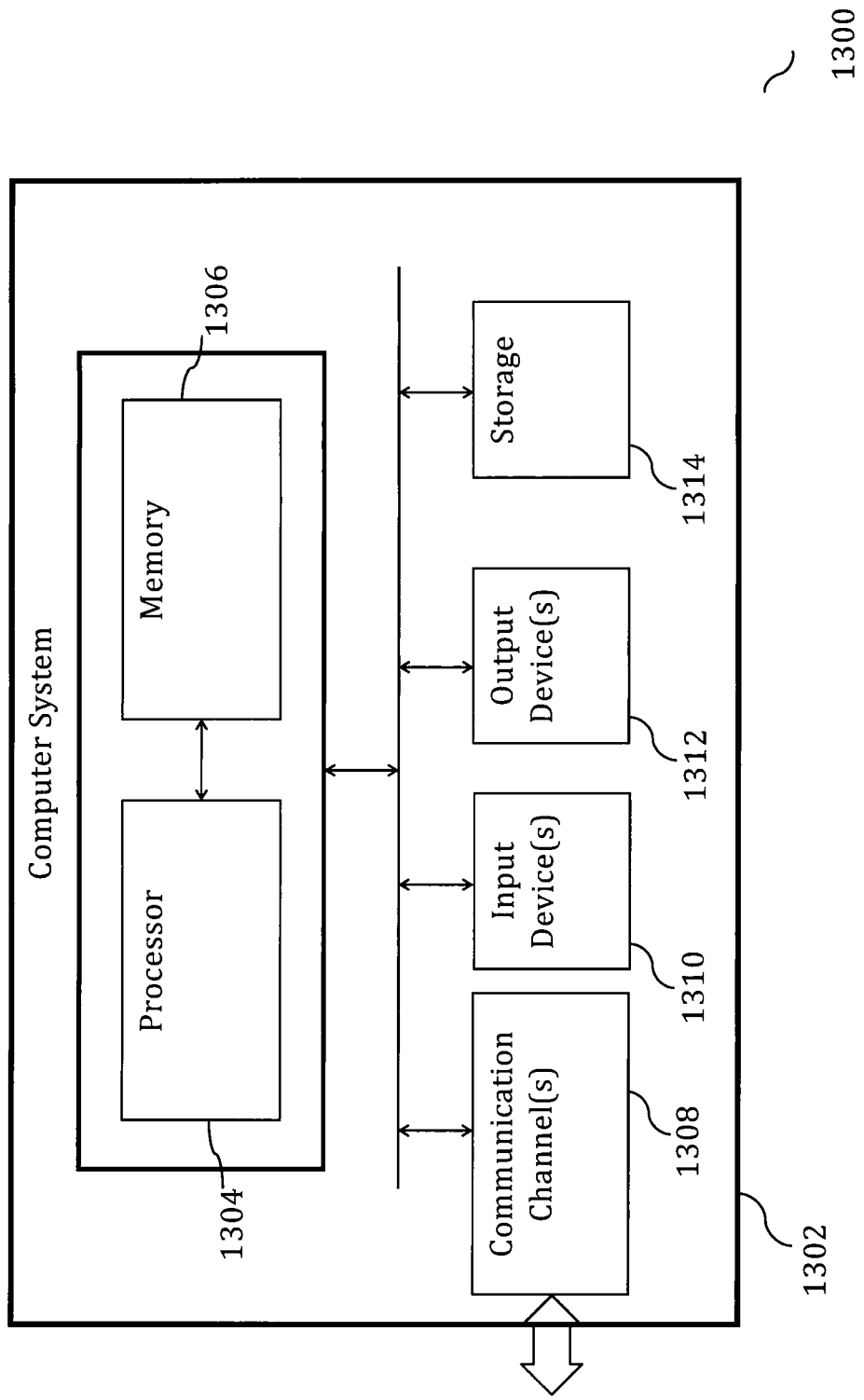
FIG. 13 illustrates an exemplary computer system according to which various embodiments of the present invention may be implemented.

FIG. 13 illustrates an exemplary computer system according to which various embodiments of the present invention may be implemented.

System 1300 includes computer system 1302 which in turn comprises one or more processors 1304 and at least one memory 1306. Processor 1304 is configured to execute program instructions—and may be a real processor or a virtual processor. It will be understood that computer system 1302 does not suggest any limitation as to scope of use or functionality of described embodiments. The computer system 1302 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1302 in accordance with the present invention may include one or more servers, desktops, laptops, tablets, smart phones, mobile phones, mobile communication devices, phablets and personal digital assistants. In an embodiment of the present invention, the memory 1306 may store software for implementing various embodiments of the present invention. The computer system 1302 may have additional components. For example, the computer system 1302 may include one or more communication channels 1308, one or more input devices 1310, one or more output devices 1312, and storage 1314. An interconnection mechanism (not shown) such as a bus, controller, or network, interconnects the components of the computer system 1302. In various embodiments of the present invention, operating system software (not shown) provides an operating environment for various softwares executing in the computer system 1302 using a processor 1304, and manages different functionalities of the components of the computer system 1302.

The communication channel(s) 1308 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 1310 may include, but is not limited to, a touch screen, a keyboard, mouse, pen, joystick, trackball, a voice device, a scanning device, or any another device that is capable of providing input to the computer system 1302. In an embodiment of the present invention, the input device(s) 1310 may be a sound card or similar device that accepts audio input in analog or digital form. The output device(s) 1312 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1302.

The storage 1314 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1302. In various embodiments of the present invention, the storage 1314 may contain program instructions for implementing any of the described embodiments.

In an embodiment of the present invention, the computer system 1302 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1302. The method described herein is typically implemented as a computer program product, comprising a set of program instructions that is executed by the computer system 1302 or any other similar device. The set of program instructions may be a series of computer readable codes stored on a tangible medium, such as a computer readable storage medium (storage 1314), for example, diskette, CD-ROM, ROM, flash drives or hard disk, or transmittable to the computer system 1302, via a modem or other interface device, over either a tangible medium, including but not limited to optical or analogue communications channel(s) 1308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

Based on the above, it would be apparent that the present invention offers multiple and significant advantages.

A principle advantage over the existing state of the art is that the invention enables dynamic or need based retrieval of data object(s) from on-premise devices, thereby reducing the time and network latency involved in provisioning an application environment that is necessary for execution of a remote application iteration, at a remote server.

The invention also enables users to run multiple remote iterations of the client application software within a remote server platform. In this aspect as well, the ability to implement dynamic or need based retrieval of data object(s) reduces the exponential increase in the data and network latency overheads that are typically observed in prior art systems that seek to enable multiple simultaneous cloud based iterations of a client software application. Further, by generating and maintaining an independent and distinct application environment instance corresponding to each remote application iteration of the same client application software that is being executed at the remote server, the invention ensures modularity and security of data corresponding to each remote application iteration.

Yet further, by relying on metadata previously obtained from an on-premise device to modulate the parameters of data object retrieval messages sent to an on-premise device from a remote server, the invention is able to significantly reduce the data and time overheads in the look-up and retrieval process, and has been found to make the overall process of data object retrieval from on-premise devices significantly faster and more efficient.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

The invention claimed is:

1. A method for execution of an application software iteration at a remote server through network based access to an on-premise device, the method comprising:
   instantiating at the remote server:
      a remote application iteration of a client application software, wherein said client application software has a corresponding local instance of an application environment stored on the on-premise device; and
      a remote application environment instance corresponding to the remote application iteration, wherein said remote application environment instance does not include all data objects stored within the local instance of an application environment stored on the on-premise device;
   executing at the remote server, application software code corresponding to the remote application iteration;
   identifying one or more data objects required by the application software code;
   in response to determining that the identified one or more data objects are not available within the remote application environment instance, initiating retrieval of the identified one or more data objects from the local instance of an application environment stored on the on-premise device and transmitting the identified one or more data objects to the remote server; and
   executing the application software code at the remote server based on the one or more data objects retrieved from the local instance of an application environment stored on the on-premise device;
   wherein transmission of the identified one or more data objects to the remote server from the local instance of the application environment within the on-premise device is accompanied by transmission of metadata from the on-premise device to the remote server;
   and wherein the metadata transmitted from the on-premise device to the remote server describes file contents within a file system directory within the on-premise device, from which file system directory the one or more data objects being transmitted from the on-premise device to the remote server, have been retrieved.

2. The method as claimed in claim 1, wherein the metadata received at the remote server comprises data that describes attributes of one or more data files, data records, directories, folders or file paths within a file system corresponding to the on-premise device.

3. The method as claimed in claim 1 wherein the remote server:
   generates or modifies a metadata image based on metadata received from the on-premise device; and
   stores the metadata image in a memory accessible by the remote server, and associating the stored metadata image with the remote application environment instance.

4. The method in claim 1, wherein retrieving the identified one or more data objects from the local instance of an application environment stored on the on-premise device comprises:
   parsing the stored metadata image that is associated with the remote application environment instance for metadata corresponding to the identified one or more data objects, wherein the metadata comprises location of the identified one or more data objects on the on p on-premise device; and
   responsive to retrieval of metadata corresponding to the identified one or more data objects from the metadata image, transmit from the remote server to the on-premise device, a data object retrieval request message that includes all or some of the metadata retrieved from the metadata image;

wherein the identified one or more data objects that are subsequently received at the remote server from the on-premise device in response to the transmitted data object retrieval request message, are retrieved from the on-premise device based on the metadata that has been transmitted from the remote server to the on-premise device within the data object retrieval request message.

5. A system for execution of an application software iteration at a remote server through network based access to an on-premise device, the system comprising a remote server configured for:

instantiating:
  a remote application iteration of a client application software, wherein said client application software has a corresponding local instance of an application environment stored on the on-premise device; and
  a remote application environment instance corresponding to the remote application iteration, wherein said remote application environment instance does not include all data objects stored within the local instance of an application environment stored on the on-premise device;

executing application software code corresponding to the remote application iteration;

identifying one or more data objects required by the application software code;

in response to determining that the identified one or more data objects are not available within the remote application environment instance, initiating retrieval of the identified one or more data objects from the local instance of an application environment stored on the on-premise device and transmitting the identified one or more data objects to the remote server; and executing the application software code at the remote server based on the one or more data objects retrieved from the local instance of an application environment stored on the on-premise device;

wherein transmission of the identified one or more data objects to the remote server from the local instance of the application environment within the on-premise device is accompanied by transmission of metadata from the on-premise device to the remote server;

and wherein the metadata transmitted from the on-premise device to the remote server comprises data describing file contents within a file system directory within the on-premise device, from which file system directory the one or more data objects being transmitted from the on-premises device to the remote server have been retrieved.

6. The system as claimed in claim 5, wherein the metadata received at the remote server comprises data that describes attributes of one or more data files, data records, directories, folders or file paths within a file system corresponding to the on-premise device.

7. The system as claimed in claim 5, wherein the remote server is configured to:

generate or modify a metadata image based on metadata received from the on-premise device; and store the metadata image in a memory accessible by the remote server, and associating the stored metadata image with the remote application environment instance.

8. The system in claim 5, wherein the remote server is configured such that, retrieving the identified one or more data objects from the local instance of an application environment stored on the on-premise device comprises:

parsing the stored metadata image that is associated with the remote application environment instance for metadata corresponding to the identified one or more data objects, wherein the metadata comprises location of the identified one or more data objects on the on-premise device; and responsive to retrieval of metadata corresponding to the identified one or more data objects from the metadata image, transmit from the remote server to the on-premise device, a data object retrieval request message that includes all or some of the metadata retrieved from the metadata image;

wherein the identified one or more data objects that are subsequently received at the remote server from the on-premise device in response to the transmitted data object retrieval request message, are retrieved from the on-premise device based on the metadata that has been transmitted from the remote server to the on-premise device within the data object retrieval request message.

9. A computer program product for execution of an application software iteration at a remote server through network based access to an on-premise device, comprising a non-transitory computer usable medium having a computer readable program code embodied therein, the computer readable program code comprising instructions for implementing within a processor based computing system, the steps of:

instantiating at the remote server:
  a remote application iteration of a client application software, wherein said client application software has a corresponding local instance of an application environment stored on the on-premise device; and
  a remote application environment instance corresponding to the remote application iteration, wherein said remote application environment instance does not include all data objects stored within the local instance of an application environment stored on the on-premise device;

executing at the remote server, application software code corresponding to the remote application iteration;

identifying one or more data objects required by the application software code;

in response to determining that the identified one or more data objects are not available within the remote application environment instance, initiating retrieval of the identified one or more data objects from the local instance of an application environment stored on the on-premise device and transmitting the identified one or more data objects to the remote server; and executing the application software code at the remote server based on the one or more data objects retrieved from the local instance of an application environment stored on the on-premise device;

wherein transmission of the identified one or more data objects to the remote server from the local instance of the application environment within the on-premise device is accompanied by transmission of metadata from the on-premise device to the remote server;

and wherein the metadata transmitted from the on-premise device to the remote server comprises data describing file contents within a file system directory within the on-premise device, from which file system directory the one or more data objects being transmitted from the on-premise device to the remote server have been retrieved.

10. The method as claimed in claim 1, wherein identification of the one or more data objects required by the application software code occurs after execution of the application software code has been initiated at the remote server.

11. The method as claimed in claim 1, wherein retrieving the identified one or more data objects from the local instance of an application environment stored on the on-premise device comprises:
  parsing the stored metadata image that is associated with the remote application environment instance for metadata corresponding to the identified one or more data objects, wherein the metadata comprises location of the identified one or more data objects on the on-premise device; and
  transmitting a data retrieval request message of either a first type or a second type from the remote server to the on-premise device, wherein:
    responsive to the step of parsing the stored metadata image resulting in identification of metadata that corresponds to the identified one or more data objects, the transmitted data retrieval request message is of the first type; and
    responsive to the step of parsing the stored metadata image resulting in non-identification of metadata that corresponds to the identified one or more data objects, the transmitted data retrieval request message is of the second type;
  wherein data retrieval messages of the first type include all or some of the metadata retrieved from the metadata image; and
  wherein data retrieval messages of the second type do not include metadata retrieved from the metadata image.

12. The method as claimed in claim 11, wherein when the transmitted data retrieval request message is of the first type, the identified one or more data objects that are subsequently received at the remote server from the on-premise device in response to the transmitted data object retrieval request message, are retrieved from the on-premise device based on the metadata that has been transmitted from the remote server to the on-premise device within the data object retrieval request message.

13. The method as claimed in claim 11, wherein when the transmitted data retrieval request message is of the second type, the identified one or more data objects that are subsequently received at the remote server from the on-premise device in response to the transmitted data object retrieval request message, are not retrieved from the on-premise device based on metadata from the stored metadata image.

14. The system as claimed in claim 5, configured such that identification of the one or more data objects required by the application software code occurs after execution of the application software code has been initiated at the remote server.

15. The system as claimed in claim 5, configured such that retrieving the identified one or more data objects from the local instance of an application environment stored on the on-premise device comprises:
  parsing the stored metadata image that is associated with the remote application environment instance for metadata corresponding to the identified one or more data objects, wherein the metadata comprises location of the identified one or more data objects on the on-premise device; and
  transmitting a data retrieval request message of either a first type or a second type from the remote server to the on-premise device, wherein:
    responsive to the step of parsing the stored metadata image resulting in identification of metadata that corresponds to the identified one or more data objects, the transmitted data retrieval request message is of the first type; and
    responsive to the step of parsing the stored metadata image resulting in non-identification of metadata that corresponds to the identified one or more data objects, the transmitted data retrieval request message is of the second type;
  wherein data retrieval messages of the first type include all or some of the metadata retrieved from the metadata image; and
  wherein data retrieval messages of the second type do not include metadata retrieved from the metadata image.

16. The system as claimed in claim 15, configured such that when the transmitted data retrieval request message is of the first type, the identified one or more data objects that are subsequently received at the remote server from the on-premise device in response to the transmitted data object retrieval request message, are retrieved from the on-premise device based on the metadata that has been transmitted from the remote server to the on-premise device within the data object retrieval request message.

17. The system as claimed in claim 15, configured such that when the transmitted data retrieval request message is of the second type, the identified one or more data objects that are subsequently received at the remote server from the on-premise device in response to the transmitted data object retrieval request message, are not retrieved from the on-premise device based on metadata from the stored metadata image.

* * * * *